United States Patent
Liang et al.

(10) Patent No.: US 11,250,327 B2
(45) Date of Patent: Feb. 15, 2022

(54) EVOLUTION OF DEEP NEURAL NETWORK STRUCTURES

(71) Applicant: Cognizant Technology Solutions U.S. Corporation, College Station, TX (US)

(72) Inventors: Jason Zhi Liang, Fremont, CA (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 1148 days.

(21) Appl. No.: 15/794,905

(22) Filed: Oct. 26, 2017

(65) Prior Publication Data

US 2018/0114115 A1     Apr. 26, 2018

Related U.S. Application Data

(60) Provisional application No. 62/413,176, filed on Oct. 26, 2016, provisional application No. 62/412,830, filed on Oct. 26, 2016.

(51) Int. Cl.
*G06N 3/08* (2006.01)
*G06N 3/04* (2006.01)

(52) U.S. Cl.
CPC ............. *G06N 3/086* (2013.01); *G06N 3/04* (2013.01); *G06N 3/0454* (2013.01); *G06N 3/084* (2013.01)

(58) Field of Classification Search
CPC ........ G06N 3/04; G06N 3/0454; G06N 3/084; G06N 3/086
See application file for complete search history.

(56) References Cited

U.S. PATENT DOCUMENTS 5,140,530 A    8/1992   Guha et al. ............... 395/13
5,761,381 A    6/1998   Arci et al.
(Continued)

FOREIGN PATENT DOCUMENTS

EP    0762294 A2    3/1997
EP    2422276       2/2012
(Continued)

OTHER PUBLICATIONS

Stanley et al., Evolving Neural Networks through Augmenting Topologies, Evolutionary Computation 10(2), pp. 99-127, Summer 2002. (Year: 2002).*
(Continued)

*Primary Examiner* — Kamran Afshar
*Assistant Examiner* — Marshall L Werner
(74) *Attorney, Agent, or Firm* — Dawn-Marie Bey; Bey & Cotropia PLLC

(57) ABSTRACT

The technology disclosed relates to evolving deep neural network structures. A deep neural network structure includes a plurality of modules with submodules and interconnections among the modules and the submodules. In particular, the technology disclosed relates to storing candidate genomes that identify respective values for a plurality of hyperparameters of a candidate genome. The hyperparameters include global topology hyperparameters, global operational hyperparameters, local topology hyperparameters, and local operational hyperparameters. It further includes evolving the hyperparameters by training, evaluating, and procreating the candidate genomes and corresponding modules and submodules.

27 Claims, 14 Drawing Sheets

(56) References Cited

U.S. PATENT DOCUMENTS

| | | | |
|---|---|---|---|
| 5,845,266 A | 12/1998 | Lupien et al. | |
| 5,920,848 A | 7/1999 | Schutzer et al. | |
| 5,930,780 A | 7/1999 | Hughes et al. | |
| 6,240,399 B1 | 5/2001 | Frank et al. | |
| 6,249,783 B1 | 6/2001 | Crone et al. | |
| 7,013,344 B2 | 3/2006 | Megiddo | |
| 7,246,075 B1 | 7/2007 | Testa | |
| 7,370,013 B1 | 5/2008 | Aziz et al. | |
| 7,444,309 B2 | 10/2008 | Branke et al. | |
| 8,639,545 B2 | 1/2014 | Cases et al. | |
| 8,768,811 B2 | 7/2014 | Hodjat et al. | |
| 9,053,431 B1 | 6/2015 | Commons | G06N 3/08 |
| 9,466,023 B1 | 10/2016 | Shahrzad et al. | |
| 9,785,886 B1 | 10/2017 | Andoni et al. | |
| 2002/0019844 A1 | 2/2002 | Kurowski et al. | |
| 2003/0014379 A1 | 1/2003 | Saias et al. | |
| 2003/0158887 A1 | 8/2003 | Megiddo | |
| 2004/0143559 A1 | 7/2004 | Ayala | 706/13 |
| 2004/0210545 A1 | 10/2004 | Branke et al. | |
| 2004/0254901 A1 | 12/2004 | Bonabeau et al. | |
| 2005/0033672 A1 | 2/2005 | Lasry et al. | |
| 2005/0136480 A1 | 6/2005 | Brahmachuri et al. | 435/7.1 |
| 2005/0187848 A1 | 8/2005 | Bonissone et al. | |
| 2005/0197875 A1 | 9/2005 | Kauffman | |
| 2005/0198103 A1 | 9/2005 | Ching | |
| 2006/0218107 A1 | 9/2006 | Young | 706/13 |
| 2007/0100907 A1 | 5/2007 | Bayer | |
| 2007/0143198 A1 | 6/2007 | Brandes et al. | |
| 2007/0143759 A1 | 6/2007 | Ozgur et al. | |
| 2007/0150435 A1 | 6/2007 | Murakawa et al. | |
| 2007/0185990 A1 | 8/2007 | Ono et al. | |
| 2008/0071588 A1 | 3/2008 | Eder | |
| 2008/0228644 A1 | 9/2008 | Birkestrand et al. | |
| 2009/0125370 A1 | 5/2009 | Blondeau et al. | |
| 2009/0327178 A1 | 12/2009 | Jacobson | |
| 2010/0030720 A1 | 2/2010 | Stephens | |
| 2010/0111991 A1 | 5/2010 | Raitano et al. | 424/185.1 |
| 2010/0182935 A1 | 7/2010 | David | |
| 2010/0256795 A1 | 10/2010 | McLaughlin et al. | |
| 2010/0257228 A1 | 10/2010 | Staggs et al. | |
| 2010/0257605 A1 | 10/2010 | McLaughlin et al. | |
| 2010/0274742 A1 | 10/2010 | Hodjat et al. | |
| 2012/0239592 A1 | 9/2012 | Esbensen | |
| 2012/0313798 A1 | 12/2012 | Markram | 341/50 |
| 2013/0311412 A1 | 11/2013 | Lazar et al. | G06N 3/08 |
| 2014/0011982 A1 | 1/2014 | Marasco et al. | C07K 16/1018 |
| 2015/0288573 A1 | 10/2015 | Baughman et al. | |
| 2016/0048753 A1 | 2/2016 | Sussillo et al. | G06N 3/04 |
| 2016/0063359 A1 | 3/2016 | Szegedy et al. | |
| 2016/0329047 A1 | 11/2016 | Tur | |
| 2016/0364522 A1 | 12/2016 | Frey et al. | G06F 19/22 |
| 2017/0109355 A1 | 4/2017 | Li et al. | G06F 17/3053 |
| 2017/0193367 A1 | 7/2017 | Miikkulainen et al. | G06N 3/086 |
| 2017/0213156 A1 | 7/2017 | Hammond et al. | G06N 99/005 |
| 2017/0323636 A1 | 11/2017 | Xiao et al. | G10L 15/16 |
| 2018/0053092 A1 | 2/2018 | Hajizadeh | |
| 2018/0114115 A1 | 4/2018 | Liang et al. | |
| 2018/0114116 A1 | 4/2018 | Liang et al. | |
| 2018/0240041 A1 | 8/2018 | Koch et al. | |

FOREIGN PATENT DOCUMENTS

| | | |
|---|---|---|
| EP | 2422278 | 2/2012 |
| JP | 08-110804 | 4/1996 |
| JP | H09114797 | 5/1997 |
| JP | 2001325041 | 11/2001 |
| JP | 2003044665 | 2/2003 |
| JP | 2004240671 | 8/2004 |
| JP | 2004302741 | 10/2004 |
| JP | 2005190372 | 6/2007 |
| JP | 2007207173 | 8/2007 |
| JP | 2007522547 | 8/2007 |
| JP | 2008129984 | 6/2008 |
| WO | WO 2005/073854 | 8/2005 |
| WO | WO 2010/120440 | 10/2010 |
| WO | WO 2017/161233 | 9/2017 |
| WO | WO 2018/211138 | 11/2018 |
| WO | WO 2018/213840 | 11/2018 |

OTHER PUBLICATIONS

Pantridge et al., Evolution of Layer Based Neural Networks: Preliminary Report, GECCO '16, pp. 1015-1022, Jul. 2016. (Year: 2016).*

International Search Report and Written Opinion for Application No. PCT/US2018/064520, dated Mar. 4, 2019, 8 pp.

Xu, et al., "Inference of Genetic Regulatory Networks With Recurrent Neural Network Models Using Particle Swarm Optimization," Missouri University of Science and Technology, Oct. 2017 [retrieved on Feb. 14, 2019], Retrieved from the Internet: http://scholarsmine.mst.edu/cgi/viewcontent.cgi?article=1751&context=ele_comeng_facwork.

International Search Report and Written Opinion for PCT App. No. PCT/US19/61198, dated Mar. 11, 2020, 15 pp.

Moriarty, David E., et al., "Forming neural networks through efficient and adaptive coevolution," Evolutionary Computation 5.4, 1997.

Lee, Chi-Ho, et al., "Evolutionary ordered neural network with a linked-list encoding scheme," Proceedings of IEEE International Conference on Evolutionary Computation, IEEE, 1996.

Utech, J., et al., "An evolutionary algorithm for drawing directed graphs," Proc. of the Int. Conf. on Imaging Science, Systems and Technology, 1998.

International Preliminary Report on Patentability for PCT App. No. PCT/US2019/061198, dated Nov. 18, 2020, 24 pp.

James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=1wAR3 hreOvBGmJZe54-631X49XedcbsQoDYIRu87BcCHEBf_vMKF8FDKK_7Nw.

Yin, et al., "ABCNN: Attention-Based Convolutional Neural Network for Modeling Sentence Pairs," Transactions of the Association for Computational Linguistics, vol. 4, pp. 259-272, 2016, Retrieved on Aug. 4, 2019, Retrieved from the Internet: https://www.mitpressjounrals.org/doi/pdf/10.1162/tacl_a_00097.

International Search Report and Written Opinion for PCT Application No. PCT/US2019/017175, dated Jun. 5, 2019, 10 pp.

Garcia-Pedraja, et. al., "Cooperative-Coevolution-of-Artificial-Neural-Networks", 2005, 32 pages.

Stanley, et al., "Evolving Neural Networks through Augmenting Topologies", 2002, 30 pages.

Snoek, et al., "Scalable Bayesian Optimization Using Deep Neural Networks", 2015, 13 pages.

Fernando et al., "Pathnet: Evolution channels gradient descent in super neural networks," arXiv preprint arXiv:1701.08734 (2017), 16 pages.

Yang et al., "Deep multi-task representation learning: A tensor factorisation approach," arXiv preprint arXiv:1605.06391 (2016), 12 pages.

Shazeer et al., "Outrageously large neural networks: The sparsely-gated mixture-of-experts layer," arXiv preprint arXiv:1701.06538 (2017), 19 pages.

Misra et al., "Cross-stitch networks for multi-task learning," In Proceedings of the IEEE Conference on Computer Vision and Pattern Recognition, pp. 3994-4003. 2016.

Miikkulainen, Risto, et al., "Evolving Deep Neural Networks," Mar. 4, 2017, 8 pp.

Stanley, Kenneth O., et al., "Real-Time Evolution of Neural Networks in the Nero Video Game," AAAI, vol. 6, 2006, 4 pp.

Scott, E. O., et al., "Understanding Simple Asynchronous Evolutionary Algorithms," Jan. 17-20, 2015, 15 pp.

Kenneth O. Stanley and Risto Miikkulainen, "Evolving Neural Networks Through Augmenting Topologies," Evolutionary Computation, 10(2):99-127, 2002.

International Search Report and Written Opinion for PCT Application No. PCT/US18/64428, dated Mar. 26, 2019, 12 pp.

(56) References Cited

OTHER PUBLICATIONS

E. Meyerson and R. Miikkulainen, "Pseudo-Task Augmentation: From Deep Multitask Learning to Intratask Sharing and Back," ICML, 2018.
J. Z. Liang, et al., "Evolutionary Architecture Search For Deep Multitask Networks," GECCO, 2018.
E. Meyerson and R. Miikkulainen, "Beyond Shared Hierarchies: Deep Multitask Learning Through Soft Layer Ordering," ICLR, 2018.
International Search Report and Written Opinion for PCT Application No. PCT/US18/65472, dated Mar. 27, 2019, 8 pp.
U.S. Appl. No. 15/794,913 titled "Cooperative Evolution of Deep Neural Network Structures," filed Oct. 26, 2017.
U.S. Appl. No. 15/915,028, titled "Asynchronous Evaluation Strategy For Evolution of Deep Neural Networks," filed Mar. 3, 2018.
Risto Miikkulainen, "Evolving Multitask Neural Network Structure," The University of Texas at Austin and Sentient Technologies, Inc., Aug. 26, 2013.
Bredeche, et al., "On-Line, On-Board Evolution of Robot Controllers," In: Artificial Evolution: 9.sup.th International Conference, Evolution Artificielle, EA, 2009, Strasbourg, France, Oct. 26-28, 2009 [online], [retrieved on Mar. 15, 2019], Retrieved from the Internet: https://dl.acm.org/citation.cfm?id=1883723.1883738.
Rosenbaum, et al., "Routing Networks: Adaptive Selection of Non-Linear Funcdtions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2.
Bonadiman, et al., "Multitask Learning with Deep Neural Networks for Community Question Answering," In: Cornell University Library/Computer Science/Machine Learning, Feb. 13, 2017 [online] [retrieved on Mar. 15, 2019], Retrieved from the Internet: https://arxiv.org/abs/1702.03706.
Ruder, "An Overview of Multi-Task Learning in Deep Neural Networks," In: Cornell University Library/Computer Science/Machine Learning, Jun. 15, 2017 [online] [retrieved on Mar. 15, 2019], Retrieved from the Internet: https://arxiv.org/abs/1706.05098.
Hodjat et al., "Chapters: Introducing an Age-Varying Fitness Estimation Function." Genetic Programming Theory and Practice X. Ed. Riolo et al., Springer Apr. 19, 2013, pp. 59-71.
Gonzalez, et al., "Evolving Loss Functions With Multivariate Taylor Polynomial Parameterizations," Version 1, published arXiv: 2002.00059v1, Jan. 31, 2020.
Gonzalez, et al., "Evolving Loss Functions With Multivariate Taylor Polynomial Parameterization," Version 2, published arXiv: 2002.00059v2), Feb. 10, 2020.
Gonzalez, et al., "Optimizing Loss Functions Through Multivariate Taylor Polynomial Parameterization," Version 3 (published arXiv:2002.00059v3), Jun. 6, 2020.
N. Hansen, et al, "Adapting arbitrary normal mutation distributions in evolution strategies: The covariance matrix adaptation," In Proceedings of IEEE International Conference on Evolutionary Computation, pp. 312-317, IEEE, 1996.
Hansen, et al., "Completely derandomized self-adaptation in evolution strategies," Evolutionary Computation, vol. 9, No. 2, pp. 159-195, 2001.
N. Hansen, et al., "Evaluating the CMA evolution strategy on multimodal test functions," International Conference on Parallel Problem Solving from Nature, Springer, pp. 282-291, 2004.
H. Li, et al., "Visualizing the loss landscape of neural nets," Advances in Neural Information Processing Systems 31, pp. 6389-6399 (Curran Associates, Inc., 2018), arXiv:1712.09913v3, Nov. 7, 2018.
Liang, et al, "Population-Based Training for Loss Function Optimization," arXiv:2002.04225v1 (Feb. 11, 2020).
"Python vs. R for Artificial Intelligence, Machine Learning, and Data Science," by Scenario or Task by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/python-vs-or-r-artificial-intelligence-ai-machine-learning-data-science-which-use, 27 pp.
Production vs Development Artificial Intelligence and Machine Learning, by Alex Castrounis of Innoarchitech, published online by O'Reilly Media, Copyright InnoArchiTech LLC 2020 [retrieved on Oct. 16, 2020], Retrieved from the Internet: https://www.innoarchitech.com/blog/development-vs-or-production-batch-offline-online-Automated-artificial-intelligence-ai-machine-learning, 24 pp.
"Advanced Analytics Packages, Frameworks, and Platforms," by Alex Castrounis of Innoarchitech, published online by O'Reilly Media, Copyright InnoArchiTech LLC 2020 [retrieved Oct. 16, 2020], Retrieved from the Internet: https://www.innoarrchitech.com/blog/paekages-frameworks-platfoms-by-scenario-task-Artificial-intelligence-ai-machine-learning-data-science, 29 pp.
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019.
Santiago Gonzalez, et al., "Improved Training Speed, Accuracy, and Data Utilization Through Loss Function Optimization," Version 2, arXiv: 1905.11528v2, dated Feb. 10, 2020.
Santiago Gonzalez, et al., "Improved Training Speed, Accuracy, and Data Utilization Through Loss Function Optimization," Version 3, arXiv: 1905.11528v3, dated Apr. 27, 2020.
J. T. Barron, "A General and Adaptive Robust Loss Function," arXiv: 1701.03077v6, 2018.
K. Janocha and W. M. Czarnecki, "On Loss Functions for Deep Neural Networks in Classification," arXiv: 1702.05659, 2017.
A. Krizhevsky, et al., "ImageNet Classification With Deep Convolutional Neural Networks," NIPS'12: Proceedings of the 25th International Conference on Neural Information Processing Systems, vol. 1, Dec. 2012, pp. 1097-1105.
"CS 224D: Deep Learning for NLP, Lecture Notes: Part III", 14 pp., Spring, 2016.
"CS 224D: Deep Learning for NLP, Lecture Notes: Part IV", 12 pp., Spring, 2015.
"CS 224D: Deep Learning for NLP, Lecture Notes: Part V", 6 pp., Spring, 2015.
U.S. Appl. No. 62/468,224, titled "Asynchronous Evaluation Strategy For Evolution of Deep Neural Networks," filed Mar. 7, 2017.
Aditya Rawal and Risto Miikkulainen, "From Nodes to Networks: Evolving Recurrent Neural Networks." GECCO '18, Jul. 15-19, 2018, Kyoto, Japan.
Julian G. Zilly, Rupesh Kumar Srivastava, Jan Koutnik. and Jurgen Schmidhuber, "Recurrent Highway Networks." CoRR abs/1607.03474, 2016 (Arxiv: 1607.03474).
U.S. Appl. No. 62/627,658, titled "From Nodes to Networks: Evolving Recurrent Neural Networks," filed Feb. 7, 2018.
U.S. Appl. No. 62/627,161, titled "From Nodes to Networks: Evolving Recurrent Neural Networks," filed Feb. 6, 2018.
U.S. Appl. No. 62/598,409, titled "Evolving Multitask Neural Network Structure," filed Dec. 13, 2017.
Li, Xiaodong, and Michael Kirley. "The effects of varying population density in a fine-grained parallel genetic algorithm." Evolutionary Computation. 2002. CEC'02. Proceedings of the 2002 Congress on. vol. 2. IEEE. 2002.
Fidelis. Marcos Vinicius, Heitor S. Lopes, and Alex A. Freitas. "Discovering comprehensible classification rules with a genetic algorithm." Evolutionary Computation. 2000. Proceedings of the 2000 Congress on. vol. 1. IEEE. 2000.
Dec. 23, 2008 International Search Report and Written Opinion for PCT/US2008/82876, 10 pp.
Koza. J.R, "Genetic Programming: On the Programming of Computers by Means of Natural Selection", Dec. 1992, MIT Press. pp. 1-609.
Nov. 26, 2012 Extended EP SR for EP 08847214, 9 pp.
Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

(56) References Cited

OTHER PUBLICATIONS

Tanev I et al., "Scalable architecture for parallel distributed implementation of genetic programming on network of workstations," J. Systems Architecture, vol. 47, Jul. 2001, pp. 557-572.
Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/introduction to E volutionary Algorithms.pdf).
Poli R et al., "Genetic Prograramig: An introductory Tutorial and a Survey of Techniques and Applications," Univ. Essex School of Computer Science and Eletronic Engineering Technical Report No. CES-475, Oct. 2007, 112 pp.
Jun. 16, 2011 Written Opinion from Singapore Patent Office in related application SG 201003127-6, 9 pp.
Apr. 20, 2012 Exam Report for related application AU 2008323758, 2 pp.
Sakauchi et al., UNIFINE: A Next Generation Financial Solution System of Nihon Unisys Ltd., Technology Review 'UNISYS,' Japan, Nihon Unisys Ltd., Feb. 28, 2006, vol. 25, No. 4, pp. 14-15.
JP 2010-533295, Office Action dated Apr. 16, 2013, 12 pages.
U.S. Appl. No. 14/014,063--Office Action dated May 7, 2014, 19 pages.
JP 2012-508663--Office Action dated Apr. 1, 2014, 6 pages (with English Translation).
JP 2012-508660--Office Action dated Apr. 1, 2014, 8 pages (with English Translation).
International Search Report dated Jun. 29, 2010 in PCT/US10/32841.
M.-R Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, 2003, pp. 61-66.
JE Bartlett II, et al., "Organizational Research: Determining Appropriate Sample Size in Survey Research," IT, Learning, and Performance Journal 19(1) 2001, 8pp.
JC Bongard, et al., "Guarding Against Premature Convergence while Accelerating Evolutionary Search," Proc. 12th annual conf. of Genetic and evolutionary computation, 20201, 8pp.
M Davarynejad, "Fuzzy Fitness Granulation in Evolutionary Algorithms for complex optimization," Master of Science Thesis, Ferdowsi Univ. of Mashhad, 2007, 30pp.
M Davarynejad et al., "A Novel General Framework for Evolutionary Optimization: Adaptive Fuzzy Fitness Granulation," CEC 2007, 6pp.
E Ducheyne et al., "Is Fitness Inheritance Useful for Real-World Applications?" Evolutionary Multi-Criterion Optimization, ser. LNCS 2631, 2003, pp. 31-42.
JM Fitzpatrick et al., "Genetic Algorithms in Noisy Environments," Machine Learning 3: 101-120, 1988.
A Gaspar-Cunha et al., "A Multi-Objective Evolutionary Algorithm Using Neural Networks to Approximate Fitness Evaluations," Int'l J. Computers, Systems and Signals, 6(1)2005, pp. 18-36.
PS Georgilakis, "Genetic Algorithm Model for Profit Maximization of Generating Companies in Deregulated Electricity Markets," Applied Artificial Intelligence, 2009, 23:6,538-552.
G Gopalakrishnan et al., "Optimal Sampling in a Noisy Genetic Algorithm for Risk-Based Remediation Design," Bridging the gap: meeting the world's water and environmental resources challenges, Proc. World Water Congress 2001, 8 pp.
H Juille, "Evolution of Non-Deterministic Incremental Algorithms as a New Approach for Search in State Spaces," Proc. 6th Int'l Conf. on Genetic Algorithms, 1995, 8pp.
A Kosorukoff, "Using incremental evaluation and adaptive choice of operators in a genetic algorithm," Proc. Genetic and Evolutionary Computation Conference, GECCO-2002, 7pp.
A Nelson, "Fitness functions in evolutionary robotics: A survey and analysis," Robotics and Autonomous Systems 57 (2009) 345-370.
S Remde, et al. "Evolution of Fitness Functions to Improve Heuristic Performance," LION 2007 II, LNCS 5313 pp. 206-219.
J Sacks, et al. "Design and Analysis of Computer Experiments," Statistical Science 4:4, 1989, 409-435.
M Salami, et al., "A fast evaluation strategy for evolutionary algorithms," Applied Soft Computing 2/3F (2003) 156-173.
J Torresen, "A Dynamic Fitness Function Applied to Improve the Generalisation when Evolving a Signal Processing Hardware Architecture," Proc EvoWorkshops 2002, 267-299 (12 pp).
BA Whitehead, "Genetic Evolution of Radial Basis Function Coverage Using Orthogonal Niches," IEEE Transactions on Neural Networks, 7:6, (1996) 1525-28.
AS Wu et al., "An incremental fitness function for partitioning parallel tales," Proc. Genetic and Evolutionary Computation Conf. (2001) 8pp.
Supplementary European Search Report dated Oct. 12, 2012 in EP 10770288.
Supplementary European Search Report dated Oct. 9, 2012 in EP 10770287.
Lopez Haimes et al., "MRMOGA: parallel evolutionary multi-objective optimization using multiple resolutions," In: Proceedings of IEEE Congress on Evolutionary Computation, 2294-2301, 2005.
Castillo Tapia et al. Applications of multi-objective evolutionary algorithms in economics and finance: A survey. IEEE Congress on Evolutionary Computation 2007: 532-539.
Bui et al. "Local Models: An Approach to Distributed Multi-objective Optimization, Computational Optimization and Applications," Computational Optimization and Application Journal, 2009, 42(1), 105-139.
Leon et al. Parallel Hypervolume-Guided Hyperheuristic for Adapting the Multi-objective Evolutionary Island Model. NICSO 2008: 261-272.
U.S. Appl. No. 13/895,238—Office Action dated Jan. 2, 2014, 17 pages.
Aug. 1, 2012 Office Action in U.S. Appl. No. 13/443,546, 12 pp.
Jun. 22, 2011 Office Action in U.S. Appl. No. 12/267,287, 16 pp.
Jul. 27, 2012 Final Office Action in U.S. Appl. No. 12/267,287, 14 pp.
AU 2010241594—Examination Report dated Oct. 8, 2013, 3 pages.
AU 2010241597—Examination Report dated Nov. 4, 2013, 4 pages.
Myers, R.H. and Montgomery, D.C., "Response Surface Methodology: Process and Product Optimization Using Designed Experiments," New York: John Wiley and Sons, Inc., 1995, pp. 1-700.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, 2004, pp. 421-424.
International Search Report dated Jul. 2, 2010 in PCT/US10/32847.
Stanley, Kenneth O., et al., "Real-time evolution of neural networks in the NERO video game." AAAI. vol. 6. 2006, 4 pages.
U.S. Appl. No. 15/794,913--Non-Provisional Application filed Oct. 26, 2017, 73 pages.

\* cited by examiner

EVOLUTION OF DEEP NEURAL NETWORK STRUCTURES

CROSS REFERENCE TO OTHER APPLICATIONS

This application claims the benefit of U.S. Provisional Patent Application No. 62/412,830, entitled "EVOLUTION OF DEEP NEURAL NETWORK STRUCTURES," filed on Oct. 26, 2016, (Atty. Docket No. GNFN 3305-1). The provisional application is hereby incorporated by reference for all purposes;

This application claims the benefit of U.S. Provisional Patent Application No. 62/413,176, entitled "COOPERATIVE EVOLUTION OF DEEP NEURAL NETWORK STRUCTURES," filed on Oct. 26, 2016, (Atty. Docket No. GNFN 3307-1). The provisional application is hereby incorporated by reference for all purposes; and This application incorporates by reference US Nonprovisional patent application entitled "COOPERATIVE EVOLUTION OF DEEP NEURAL NETWORK STRUCTURES" (Atty. Docket No. GNFN 3307-2), filed contemporaneously herewith.

FIELD OF THE TECHNOLOGY DISCLOSED

The technology disclosed relates generally to evolving deep neural network structures such as deep learning neural networks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The technology disclosed relates to evolving deep neural network structures. A deep neural network structure includes a plurality of modules with submodules and interconnections among the modules and the submodules. In particular, the technology disclosed relates to storing candidate genomes that identify respective values for a plurality of hyperparameters of a candidate genome. The hyperparameters include global topology hyperparameters, global operational hyperparameters, local topology hyperparameters, and local operational hyperparameters. The technology disclosed further includes evolving the hyperparameters by training, evaluating, and procreating the candidate genomes and corresponding modules and submodules.

Neuroevolution is a recent paradigm in the area of evolutionary computation focused on the evolution of co-adapted individuals with subcomponents without external interaction. In neuroevolution, a number of species are evolved together. The cooperation among the individuals and/or the subcomponents is encouraged by rewarding the individuals and/or the subcomponents based on how well they cooperate to solve a target problem. The work on this paradigm has shown that evolutionary models present many interesting features, such as specialization through genetic isolation, generalization, and efficiency. Neuroevolution approaches the design of modular systems in a natural way, as the modularity is part of the model. Other models need some a priori knowledge to decompose the problem by hand. In many cases, either this knowledge is not available or it is not clear how to decompose the problem.

However, conventional neuroevolution techniques converge the population such that the diversity is lost and the progress is stagnated. Also, conventional neuroevolution techniques require too many parameters to be optimized simultaneously (e.g., thousands and millions of weight values at once). In addition, the deep learning structures used by conventional neuroevolution techniques are excessively large and thus difficult to optimize.

Therefore, an opportunity arises to provide improved systems and methods for evolving deep neural network structures.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
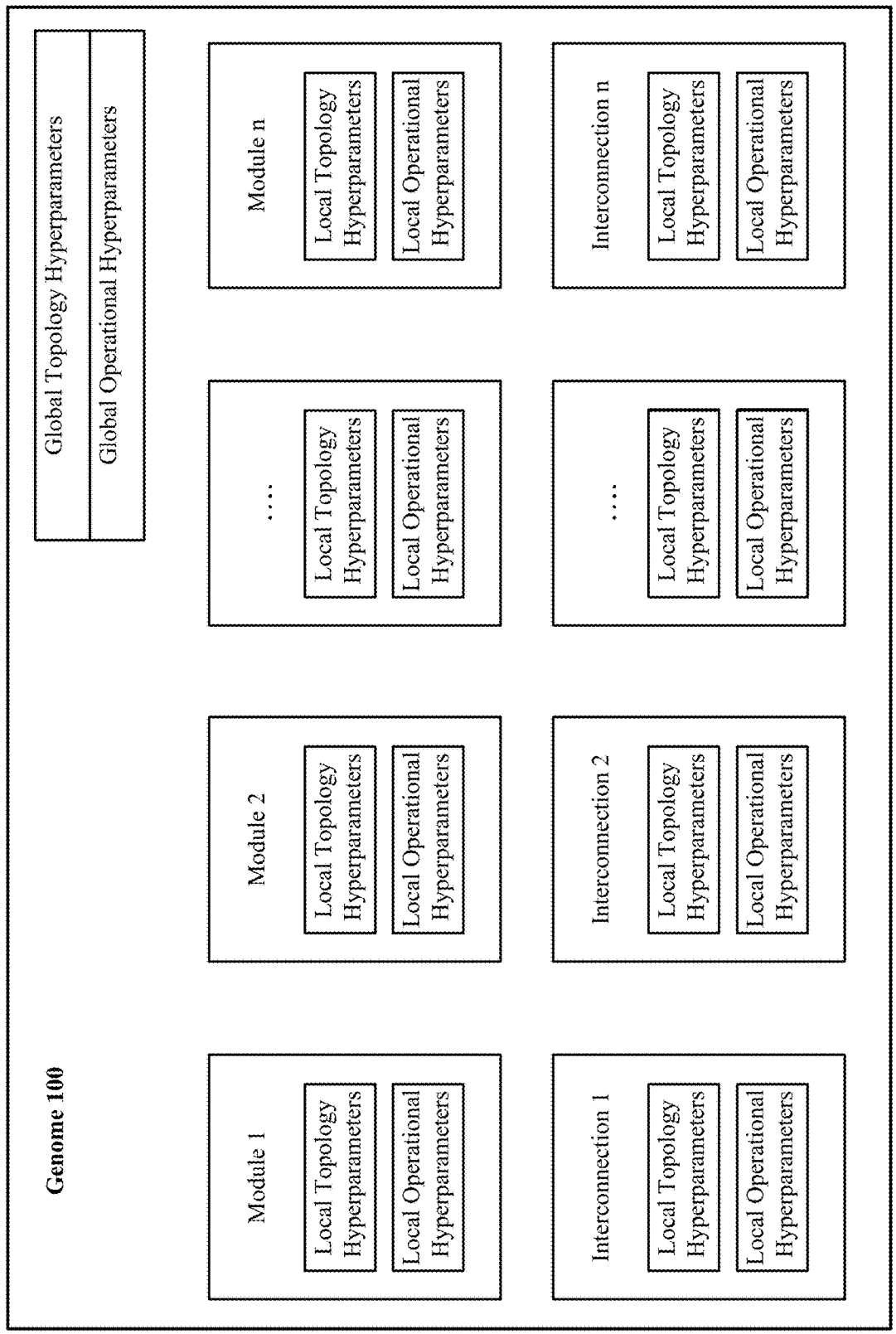
FIG. 1 illustrates one implementation of a genome identifying a plurality of hyperparameters that further identify a plurality of modules in the genome and interconnections among the modules in the genome.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Terminology

Module: As used herein, the term "module" refers to a processor that receives information characterizing input data and generates an alternative representation and/or characterization of the input data. A neural network is an example of a module. Other examples of a module include a multilayer perceptron, a feed-forward neural network, a recursive neural network, a recurrent neural network, a deep neural network, a shallow neural network, a fully-connected neural network, a sparsely-connected neural network, a convolutional neural network that comprises a fully-connected neural network, a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on. Yet other examples of a module include individual components of a convolutional neural network, such as a one-dimensional (1D) convolution module, a two-dimensional (2D) convolution module, a three-dimensional (3D) convolution module, a feature extraction module, a dimensionality reduction module, a pooling module, a subsampling module, a batch normalization module, a concatenation module, a classification module, a regularization module, and so on. In implementations, a module comprises learnable submodules, parameters, and hyperparameters that can be trained by back-propagating the errors using an optimization algorithm. The optimization algorithm can be based on stochastic gradient descent (or other variations of gradient descent like batch gradient descent and mini-batch gradient descent). Some examples of optimization algorithms used by the technology disclosed include Momentum, Nesterov accelerated gradient, Adagrad, Adadelta, RMSprop, and Adam. In implementations, a module is an activation module that applies a non-linearity function. Some examples of non-linearity functions used by the technology disclosed include a sigmoid function, rectified linear units (ReLUs), hyperbolic tangent function, absolute of hyperbolic tangent function, leaky ReLUs (LReLUs), and parametrized ReLUs (PReLUs). In implementations, a module is a classification module. Some examples of classifiers used by the technology disclosed include a multi-class support vector machine (SVM), a Softmax classifier, and a multinomial logistic regressor. Other examples of classifiers used by the technology disclosed include a rule-based classifier. In implementations, a module is a pre-processing module, such as an input module, a normalization module, a patch-extraction module, and a noise-addition module. In implementations, a module is a post-processing module, such as an output module, an estimation module, and a modelling module. Two modules differ in "type" if they differ in at least one submodule, parameter, or hyperparameter. In some implementations, certain modules are fixed topology modules in which a certain set of submodules are not evolved/modified and/or only evolved/modified in certain generations, and only the interconnections and interconnection weights between the submodules are evolved.

In implementations, a module comprises submodules, parameters, and hyperparameters that can be evolved using genetic algorithms (GAs). Modules need not all include a local learning capability, nor need they all include any submodules, parameters, and hyperparameters, which can be altered during operation of the GA. Preferably some, and more preferably all, of the modules are neural networks, which can learn their internal weights and which are responsive to submodules, parameters, and hyperparameters that can be altered during operation of the GA.

Any other conventional or future-developed neural networks or components thereof or used therein, are considered to be modules. Such implementations will be readily apparent to those skilled in the art without departing from the spirit and scope of the technology disclosed.

Submodule: As used herein, the term "submodule" refers to a processing element of a module. For example, in the case of a fully-connected neural network, a submodule is a neuron of the neural network. In another example, a layer of neurons, i.e., a neuron layer, is considered a submodule of the fully-connected neural network module. In other examples, in the case of a convolutional neural network, a kernel, a filter, a feature extractor, an activation function, a pooling operation, a subsampling operation, and a regularization operation, are each considered submodules of the convolutional neural network module. In some implementations, the submodules are considered as modules, and vice-versa.

Supermodule: As used herein, the term "supermodule" refers to a sequence, arrangement, composition, and/or cascades of one or more modules. In a supermodule, the modules are arranged in a sequence from lowest to highest or from nearest to farthest or from beginning to end or from first to last, and the information characterizing the input data is processed through each of the modules in the sequence. In some implementations, certain supermodules are fixed topology supermodules in which a certain set of modules are not evolved/modified and/or only evolved/modified in certain generations, and only the interconnections and interconnection weights between the modules are evolved. Portions of this application refer to a supermodule as a "deep neural network structure".

Blueprint: As used herein, the term "blueprint" refers to a sequence, arrangement, composition, and/or cascades of one or more supermodules. In a blueprint, the supermodules are arranged in a sequence from lowest to highest or from nearest to farthest or from beginning to end or from first to last, and the information characterizing the input data is processed through each of the supermodules in the sequence. In some implementations, certain blueprints are fixed topology blueprints in which a certain set of supermodules are not evolved/modified and/or only evolved/modified in certain generations, and only the interconnections and interconnection weights between the supermodules are evolved.

In Parallel: As used herein, "in parallel" or "concurrently" does not require exact simultaneity. It is sufficient if the evaluation of one of the blueprints begins before the evaluation of one of the supermodules completes. It is sufficient if the evaluation of one of the supermodules begins before the evaluation of one of the blueprints completes.

Identification: As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify".

In Dependence Upon: As used herein, a given signal, event or value is "in dependence upon" a predecessor signal, event, or value of the predecessor signal, event, or value influenced by the given signal, event, or value. If there is an intervening processing element, step or time period, the given signal, event, or value can still be "in dependence upon" the predecessor signal, event, or value. If the intervening processing element or step combines more than one signal, event, or value, the signal output of the processing element or step is considered "in dependence upon" each of the signal, event, or value inputs. If the given signal, event, or value is the same as the predecessor signal, event, or value, this is merely a degenerate case in which the given signal, event, or value is still considered to be "in dependence upon" or "dependent on" or "based on" the predecessor signal, event, or value. "Responsiveness" of a given signal, event, or value upon another signal, event, or value is defined similarly.

System Overview

FIG. 1 illustrates one implementation of a genome 100 identifying a plurality of hyperparameters that further identify a plurality of modules in the genome 100 and interconnections among the modules in the genome 100. The hyperparameters include global topology hyperparameters that identify a plurality of modules (e.g., module 1 to module n) in the genome 100 and interconnections among the modules in the genome 100. In one implementation, at least one of the modules in the genome 100 includes a neural network. In implementations, each genome (such as genome 100) has associated therewith storage for an indication of a respective fitness value.

The hyperparameters further include local topology hyperparameters that identify a plurality of submodules of the neural network and interconnections among the submodules. In some implementations, the hyperparameters further include global topology hyperparameters. In other implementations, the hyperparameters further include local topology hyperparameters. Global hyperparameters apply to and/or are configured for an entire deep neural network structure, i.e., they apply uniformly across all the modules of a deep neural network structure. In contrast, local hyperparameters apply to and/or are configured for respective modules in a deep neural network structure, i.e., each module in a deep neural network structure can have its own set of local hyperparameters, which may or may not overlap with a set of local hyperparameters of another module in the deep neural network structure.

The "type" of a module is determined by a set of hyperparameters that identify the module. Two modules differ in "type" if they differ in at least one hyperparameter. For example, a convolution module can have the following local topology hyperparameters-kernel size and number of kernels. A fully-connected neural network module can have the following local topology parameters-number of neurons in a given neuron layer and number of neuron layers in the fully-connected neural network. In implementations, two modules that have a same set of hyperparameters, but different values for some of the hyperparameters are considered to belong to the same type.

A sample set of hyperparameters according to one implementation includes the following:

|  | Topology | Operational |
| --- | --- | --- |
| Global Hyperparameters | Number of modules, interconnections among the modules, type of interconnections (e.g., residual connections, skip connections), type of modules (e.g., residual blocks). | Learning rate, learning rate decay, momentum, weight initialization, regularization strength, initialization deviation, input initialization deviation, Hue shift, saturation scale, saturation shift, value scale, value shift, pixel dropout, L2 weight decay, and fully-connected layer drop out. |
| Local Hyperparameters | For a fully-connected neural network module: the number of neurons in each neuron layer, the number of neuron layers, and the interconnections among the neurons from one neuron layer to the next. For a convolutional neural network module: kernel size, number of kernels, kernel depth, kernel stride, kernel padding, activation pooling, subsampling, pooling, and normalization. For an image preprocessing module: image shift, translation, and flipping. | Learning rate, momentum, weight initialization, and fully-connected layer drop out. |
| Blueprint Hyperparameters | Number of supermodules, interconnections among the supermodules, and supermodule subpopulation for each included supermodule. | |

Figure 2:
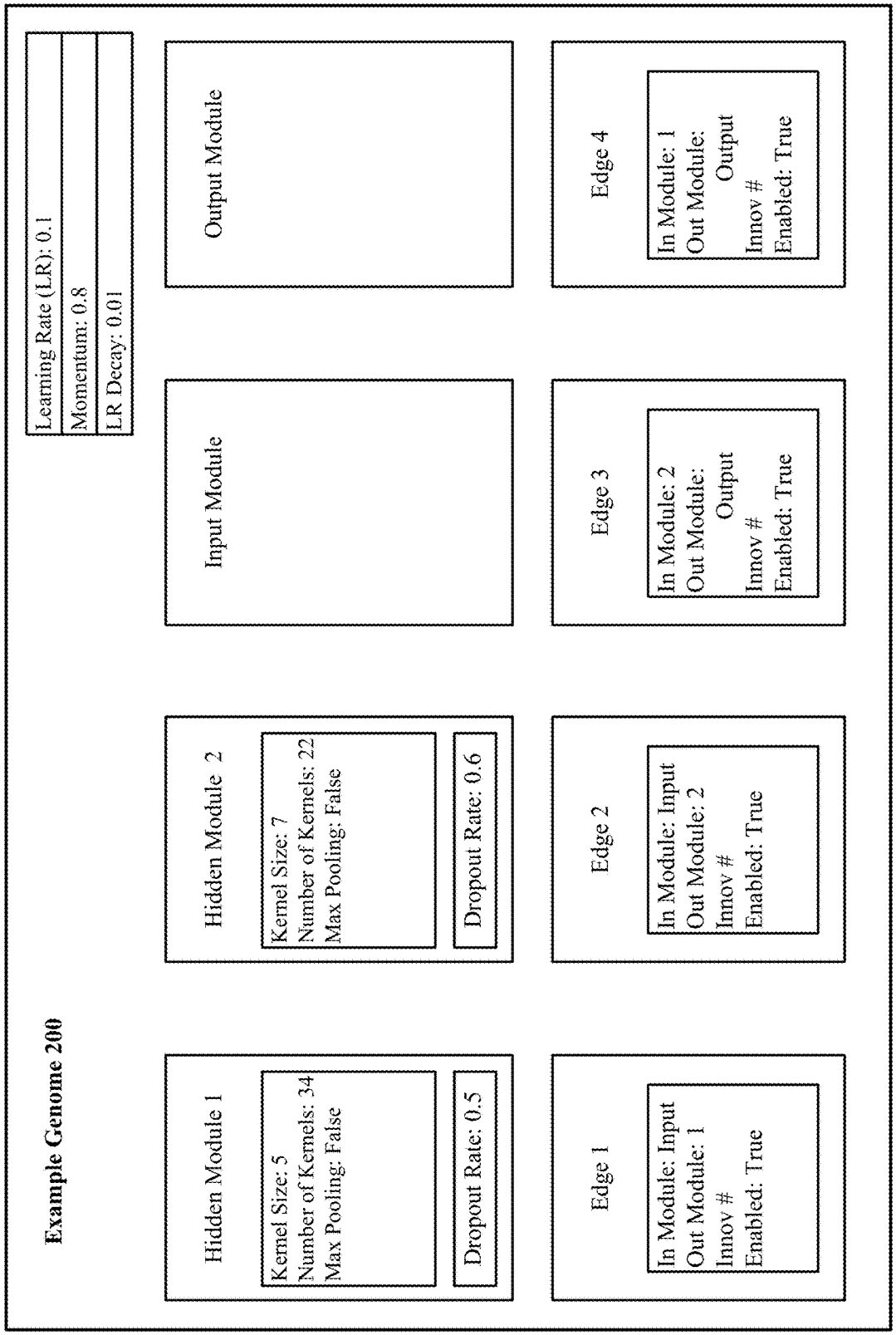
FIG. 2 depicts one implementation of an example genome identifying respective values for a plurality of hyperparameters that further identify a plurality of modules in the example genome and interconnections among the modules in the example genome.

FIG. 2 depicts one implementation of an example genome 200 identifying respective values for a plurality of hyperparameters that further identify a plurality of modules in the example genome 200 and interconnections among the modules in the example genome 200. The global topology hyperparameters of example genome 200 identify four modules, namely a first hidden module that is a first convolution module, a second hidden module that is a second convolution module, an input module, and an output module. The global topology hyperparameters of example genome 200 also identify interconnections among the four modules using edges 1 to 4. Edge 1 identifies that the input module feeds forward to the first hidden module. Edge 2 identifies that the input module also feeds forward to the second hidden module. Edge 3 identifies that the second hidden module also feeds forward to the output module. Edge 4 identifies that the first hidden module also feeds forward to the output module.

Also, in FIG. 2, the global operational hyperparameter values for hyperparameters learning rate (LR), momentum, and LR decay apply uniformly to all the modules in FIG. 2. Further, the first convolution module has different respective hyperparameter values for the kernel size and the number of kernels than that of the second convolution module. Furthermore, they have different values for the local operational hyperparameter called dropout rate.

In other implementations, different encodings, representations, and/or structures can be used to identify a module and its interconnections in the disclosed deep neural network structures. For example, encodings, representations, and/or structures equivalent to encodings, representations, and/or structures disclosed in the academic paper "Kenneth O. Stanley and Risto Miikkulainen, "Evolving neural networks through augmenting topologies," *Evolutionary Computation*, 10(2):99-127, 2002 (hereinafter "NEAT") can be used, which is incorporated by reference for all purposes as if fully set forth herein. In NEAT, the disclosure pertained to evolution of an individual neural network of a single type. In contrast, this application discloses evolution of deep neural networks structures that include a plurality of neural networks of varying types.

Figure 3:
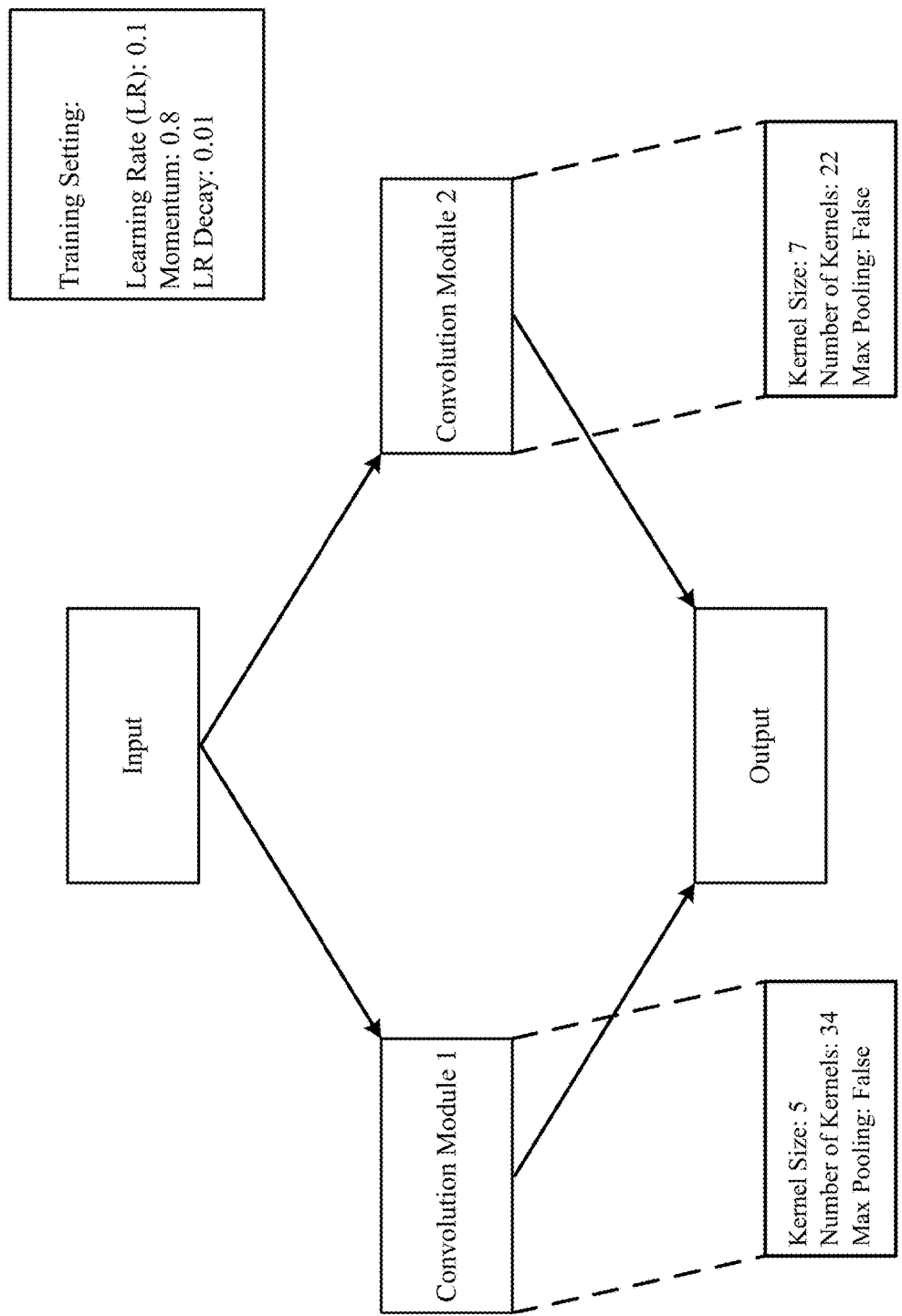
FIG. 3 depicts one implementation of a deep neural network structure generated in dependence upon the example genome depicted in FIG. 2.

FIG. 3 depicts one implementation of a deep neural network structure 300 generated in dependence upon the example genome depicted in FIG. 2. Structure 300 includes an input module that feeds forward to the first and second convolution modules. The first and second convolution modules feed forward to the output module. The hyperparameters in FIG. 2 are applied accordingly to the structure 200 and respective modules.

Figure 4:
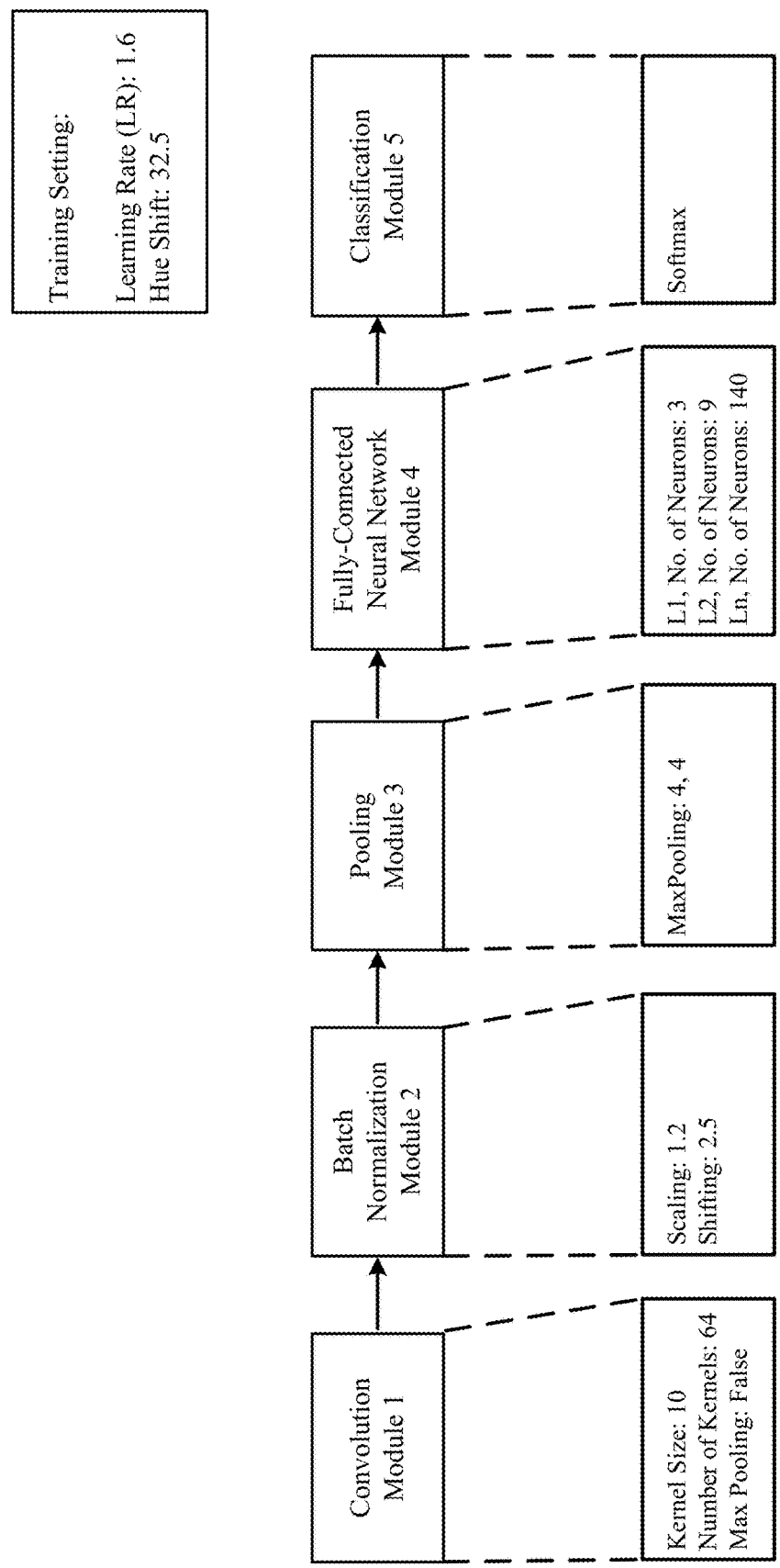
FIG. 4 depicts another implementation of a deep neural network structure generated in dependence upon an example genome generated by the technology disclosed.

FIG. 4 depicts another implementation of a deep neural network structure 400 generated in dependence upon an example genome generated by the technology disclosed. The corresponding example genome is not shown for simplicity's sake. The global topology hyperparameters of the corresponding example genome identify five modules, namely a convolution module, a batch normalization module, a pooling module, a fully-connected neural network module, and a classification module. The local topology hyperparameters of the corresponding example genome apply on a module-by-module basis. For example, the batch normalization module has two local topology hyperparameters-scaling and shifting. The pooling module has one local topology hyperparameter-maxpooling. The fully-connected neural network module has the following local topology hyperparameters-number of neurons in each neuron layer, number of neuron layers, and interconnections between the neurons. The classification module has one local topology hyperparameters-softmax. In implementations, the kernels, the neurons, and the neuron layers are considered to be submodules of the respective modules.

Figure 5:
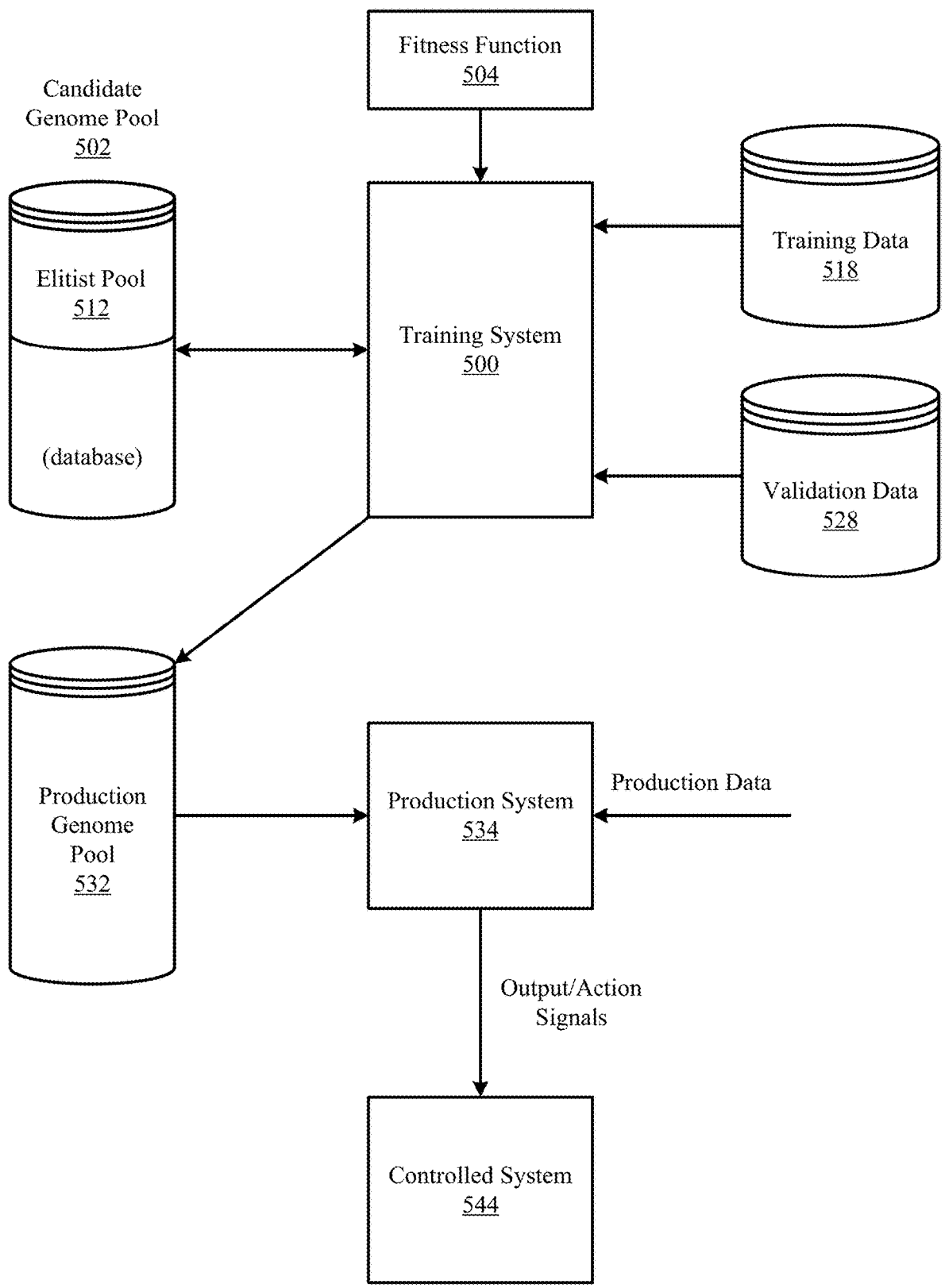
FIG. 5 shows one implementation of a training system of the technology disclosed that can be used to evolve deep neural network structures.

FIG. 5 shows one implementation of a training system 500 of the technology disclosed that can be used to evolve deep neural network structures (such as structures 300 and 400). In particular, the system depicted in FIG. 5 is divided into two portions—the training system 500 and the production system 534. The training system 500 interacts with a database 502 containing a candidate genome pool. As used herein, the term "database" does not necessarily imply any unity of structure. For example, two or more separate databases, when considered together, still constitute a "database" as that term is used herein. The candidate genome pool database 502 includes a portion 512 containing an elitist pool. In some implementations, the database 502 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

The training system 500 operates according to fitness function 504, which indicates to the training system 500 how to measure the fitness of a genome. The training system 500 optimizes for genomes that have the greatest fitness, however fitness is defined by the fitness function 504. The fitness function 504 is specific to the environment and goals of the particular application. For example, the fitness function may be a function of the predictive value of the genome as assessed against the training data 518—the more often the genome correctly predicts the result represented in the training data, the more fit the genome is considered. In a financial asset trading environment, a genome might provide trading signals (e.g., buy, sell, hold current position, exit current position), and fitness may be measured by the genome's ability to make a profit, or the ability to do so while maintaining stability, or some other desired property. In the healthcare domain, a genome might propose a diagnosis based on patient prior treatment and current vital signs, and fitness may be measured by the accuracy of that diagnosis as represented in the training data 518. In the image classification domain, the fitness of a genome may be measured by the accuracy of the identification of image labels assigned to the images in the training data 518.

In one implementation, the genomes in candidate gene pool 502 are stored and managed by conventional database management systems (DBMS), and are accessed using SQL statements. Thus, a conventional SQL query can be used to obtain, for example, the fitness function 504 of the genomes. New genomes can be inserted into the pool 502 using the SQL "insert" statement, and genomes being discarded can be deleted using the SQL "delete" statement. In another implementation, the genomes in the pool 502 are stored in a linked list. In such an implementation insertion of a new genome can be accomplished by writing its contents into an element in a free list, and then linking the element into the main linked list. Discarding of genomes involves unlinking them from the main linked list and re-linking them into the free list.

The production system 534 operates according to a production gene pool in another database 532. The production system 534 applies these genomes to production data, and produces outputs, which may be action signals or recommendations. In the financial asset trading environment, for example, the production data may be a stream of real time stock prices and the outputs of the production system 534 may be the trading signals or instructions that one or more of the genomes in the production gene pool 532 outputs in response to the production data. In the healthcare domain, the production data may be current patient data, and the outputs of the production system 534 may be a suggested diagnosis or treatment regimen that one or more of the genomes in the production gene pool 532 outputs in response to the production data. In the image classification domain, the production data may be user-selected products on a website, and the outputs of the production system 534 may be recommendations of other products that one or more of the genomes in the production gene pool 532 outputs in response to the production data. The production gene pool 532 is harvested from the training system 500 once or at intervals, depending on the implementation. Preferably, only genomes from the elitist pool 512 are permitted to be harvested. In an implementation, further selection criteria are applied in the harvesting process.

In implementations, the production system 534 is a server that is improved by the evolved genomes in the production gene pool 532. In such an implementation, the production system 534 is a server that is responsible for implementing machine learning based solutions to a provided problem. Since the evolved genomes identify hyperparameters that have high fitness function, they improve, for example, the accuracy, the processing speed, and various computations of the production system 534 during its application of machine learning based solutions. In one example, the evolved genomes identify deep neural network structures with higher learning rates. Such specialized structures can be implemented at the production system 534 to provide sub-second responses to queries seeking real-time machine learned answers to a provided problem. In another example, the superior kernels, scaling, and shifting hyperparameters of a convolutional neural network, the superior neurons and neuron layers of a fully-connected neural network, and the superior interconnection weights between the kernels and between the neurons are used to enhance the accuracy of the production system 534 for real-time tasks such as image classification, image recognition, gesture recognition, speech recognition, natural language processing, multivariate testing, pattern recognition, online media recommendation, and so on. The result is an improved production system 534 with enhanced functionalities.

The controlled system 544 is a system that is controlled automatically by the signals from the production system 534. In the financial asset trading environment, for example, the controlled system may be a fully automated brokerage system which receives the trading signals via a computer network (not shown) and takes the indicated action. In a webpage testing environment, for example, the controlled system 544 is a product distribution e-warehouse (e.g., Amazon.com™) that receives the signals via a computer network (not shown) and takes appropriate transactional and delivery actions. Depending on the application environment, the controlled system 544 may also include mechanical systems such as engines, air-conditioners, refrigerators, electric motors, robots, milling equipment, construction equipment, or a manufacturing plant.

Figure 6:
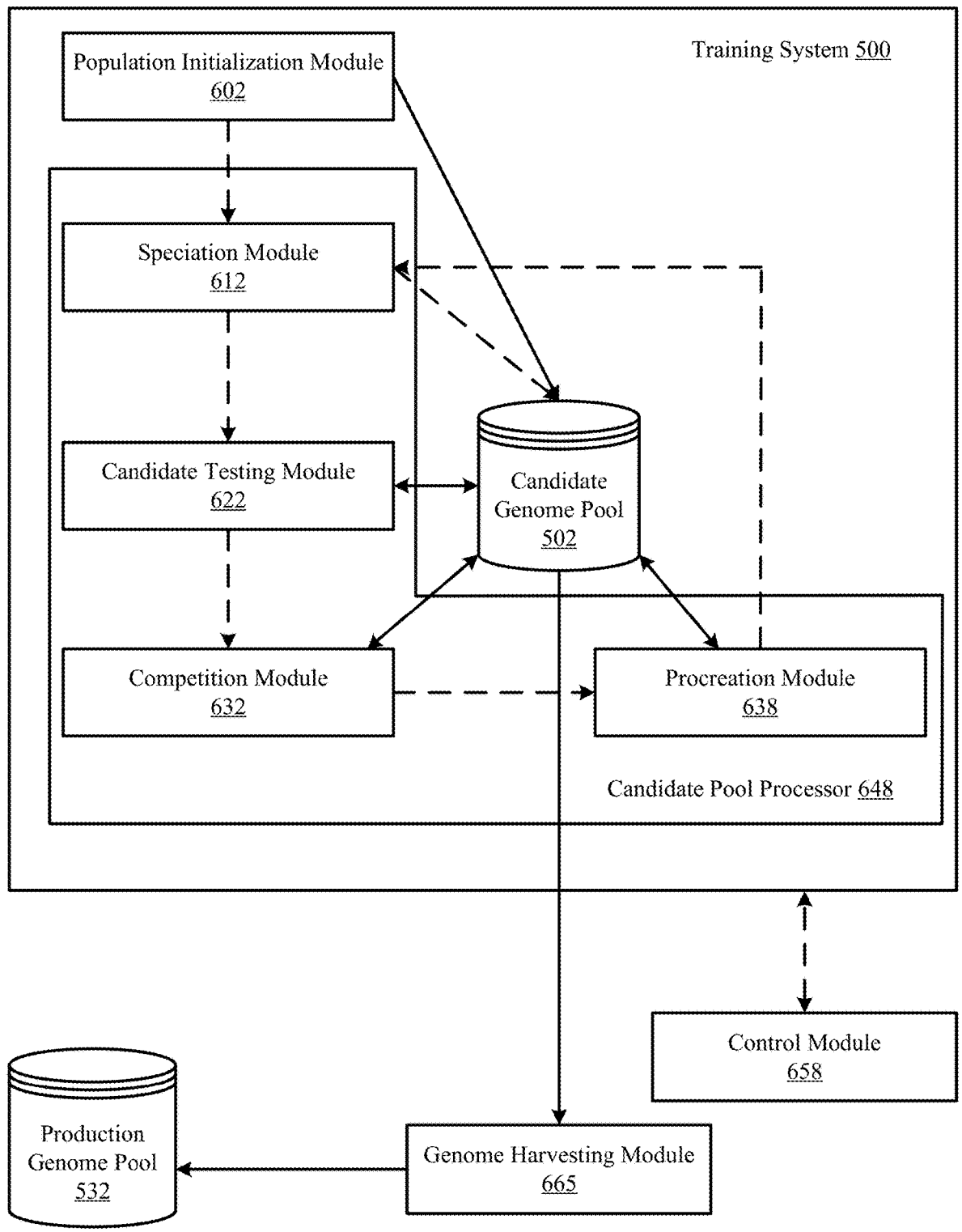
FIG. 6 illustrates various modules that can be used to implement the functionality of the training system depicted in FIG. 5.

FIG. 6 illustrates various modules that can be used to implement the functionality of the training system 500 depicted in FIG. 5. In FIG. 6, solid lines indicate data flow and broken lines indicate control flow. The modules in FIG. 6 can be implemented in hardware or software, and need not be divided up in precisely the same blocks as shown in FIG. 6. Some can also be implemented on different processors or computers, or spread among a number of different processors or computers. In addition, it will be appreciated that some of the modules can be combined, operated in parallel or in a different sequence than that shown in FIG. 6 without affecting the functions achieved. Also as used herein, the term "module" can include "submodules", which themselves can be considered herein to constitute modules. In particular, the candidate testing module 622, competition module 632, and procreation module 638 are also considered herein to be submodules of a candidate pool processor 648. The blocks in FIG. 6 designated as modules can also be thought of as flowchart steps in a method.

Referring to FIG. 5 again, the candidate genome pool 502 is initialized by a population initialization module 502, which creates an initial set of candidate genomes in the population 502. These genomes can be created randomly, or in some implementations a priori knowledge is used to seed the first generation. In another implementation, genomes from prior runs can be borrowed to seed a new run. At the start, all genomes are initialized with a fitness function 504 that is indicated as undefined.

In one implementation, the population initialization module 602 initializes the memory with an initial candidate genome pool. In some implementations, global topology hyperparameters of each of the candidate genomes in the initial candidate genome pool identify a plurality of minimal structure modules in each candidate genome. In one implementation, at least one of the minimal structure modules is a neural network with zero hidden submodules.

In some implementations, each of the candidate genomes in the initial candidate genome pool identify uniform respective values for the global topology hyperparameters in the respective candidate genomes. In other implementations, each of the candidate genomes in the initial candidate genome pool identify different respective values for the global topology hyperparameters in the respective candidate genomes. In yet other implementations, each of the candidate genomes in the initial candidate genome pool identify different respective values for at least one of the local topology hyperparameters in the respective candidate genomes. In yet further implementations, each of the candidate genomes in the initial candidate genome pool identify different respective values for at least one of local operational hyperparameters in the respective candidate genomes. In yet other implementations, each of the candidate genomes in the initial candidate genome pool identify different respective values for at least one of global operational hyperparameters in the respective candidate genomes.

Speciation module 612 clusters the genes in the candidate genome pool 502 into species, in some implementations. Speciating the pool 502 allows genomes to compete primarily within their own niches instead of with the population at large. This way, new genomes are protected in a new species where they have time to optimize their structure through competition within the species. The idea is to divide the population into species such that similar topologies are in the same species. Some implementations of the technology disclosed apply NEAT's techniques of procreating and niching a single neural network at the level of the disclosed deep neural networks structure, which comprises a plurality of different types of neural networks. For example, the technology disclosed, in some implementations, uses NEAT's historical markings to track entire modules.

In implementations, the speciation module 612 groups the evaluated genomes from the candidate pool 502 into species by similarity. In one implementation, the similarity is determined by comparing the global topology hyperparameter values of the genomes. In another implementation, the similarity is determined by comparing the local topology hyperparameter values of respective modules in the genomes. In yet another implementation, the similarity is determined by comparing the global operational hyperparameter values of the genomes. In a further implementation, the similarity is determined by comparing the local operational hyperparameter values of respective modules in the genomes. In yet further implementation, the similarity is determined by comparing the local operational hyperparameter values of respective modules in the genomes.

Candidate testing module 622 then proceeds to train the genomes and corresponding modules in the pool 502 on the training data 518. In one implementation, it does so by back-propagating the errors using an optimization algorithm, as discussed above. Once trained, the candidate testing module 622 then tests the genomes and corresponding modules in the pool 502 on the validation data 528. Each genome undergoes a battery of tests or trials on the validation data 528, each trial testing the genome on one sample. In one implementation, each battery might comprise only a single trial. Preferably, however, a battery of tests is much larger, for example on the order of 1000 trials. Note there is no requirement that all genomes undergo the same number of trials. After the tests, candidate testing module 622 updates the fitness estimate associated with each of the genomes tested.

In an implementation, the fitness estimate may be an average of the results of all trials of the genome. In this case the "fitness estimate" can conveniently be indicated by two numbers: the sum of the results of all trials of the genome, and the total number of trials that the genome has experienced. The latter number may already be maintained as the experience level of the genome. The fitness estimate at any particular time can then be calculated by dividing the sum of the results by the experience level of the genome. In an implementation such as this, "updating" of the fitness estimate can involve merely adding the results of the most recent trials to the prior sum.

Next, the competition module 632 updates the candidate genome pool 502 contents in dependence upon the updated fitness estimates. In discarding of genomes in dependence upon their updated fitness values, the competition module 622 compares the updated fitness values of genomes only to other genomes in the same species, in some implementations. The operation of module 632 is described in more detail below, but briefly, the module discards genomes that do not meet the minimum genome fitness of their respective species, and discards genomes that have been replaced in a species by new entrants into that species. In other implementations, the module discards genomes that do not meet the minimum baseline genome fitness or whose "genome fitness" relatively lags the "genome fitness" of similarly tested genomes. Pool 502 is updated with the revised contents. In other implementations, all remaining genomes form the elitist pool 512. In yet other implementations, the elitist pool 512 is a subset of the remaining genomes.

After the pool 502 has been updated, the procreation module 638 evolves a random subset of them. Only genomes in the elitist pool 512 are permitted to procreate. Any conventional or future-developed technique can be used for procreation. In an implementation, conditions, outputs, or rules from parent genomes are combined in various ways to form child genomes, and then, occasionally, they are mutated. The combination process for example may include crossover—i.e., exchanging conditions, outputs, or entire rules between parent genomes to form child genomes. New genomes created through procreation begin with performance metrics that are indicated as undefined. Preferably, after new genomes are created by combination and/or mutation, the parent genomes are retained. In this case the parent genomes also retain their fitness function 504, and remain in the elitist pool 512. In another implementation, the parent genomes are discarded.

In implementations, the competition module 632 manages the graduation of genomes from the pool 502 to the elitist pool 512. This process can be thought of as occurring one genome at a time, as follows. First, a loop is begun through all genomes from whom the fitness function 504 have been updated since the last time the competition module 632 was executed. If the fitness function 504 for a current genome is still below a baseline genome fitness or sufficiently lags relative genome fitness of other genomes, then the genome is discarded and the next one is considered. If the fitness function 504 for the current genome is above a baseline genome fitness or relatively on par with genome fitness of other genomes, then the genome is added to the elitist pool 512. The process then moves on to consider the next genome in sequence.

In implementations, the procreation module 638, in forming new genomes, forms certain new genomes by crossover between two selected parent genomes such that for all new genomes formed by crossover between two selected parent genomes, the two selected parent genomes share a single species. In one implementation, the procreation module 638, in forming new genomes, incrementally complexifies the minimal structure modules in each candidate genome. In some implementations, the incremental complexification comprises adding new submodules in the minimal structure modules using mutation. In another implementation, the procreation module 638 forms new genomes in dependence upon a respective set of at least one parent genome with at least one minimal structure module, and certain new genomes identify global topology hyperparameter values identifying new complex submodules formed in dependence upon the minimal structure module using crossover. In yet another implementation, the procreation module 638 forms new genomes in dependence upon a respective set of at least one parent genome with at least one minimal structure module, and at least one of the new genomes identifies values for global topology hyperparameters identifying new complex submodules formed in dependence upon the minimal structure module using crossover.

In some implementations, the procreation module 638, in forming new genomes, forms certain new genomes by crossover between the global topology hyperparameter values of two selected parent genomes. In one implementation, the crossover between the global topology hyperparameter values of the two selected parent genomes includes a crossover between modules of the parent genomes. In another implementation, the crossover between the global topology hyperparameter values of the two selected parent genomes includes a crossover between interconnections among modules of the parent genomes.

In some implementations, the procreation module 638, in forming new genomes, forms certain new genomes by crossover between the local topology hyperparameter values of respective modules of two selected parent genomes. In one implementation, the crossover between the local topology hyperparameter values of the two selected parent genomes includes a crossover between submodules of the parent genomes. In another implementation, the crossover between the local topology hyperparameter values of the two selected parent genomes includes a crossover between interconnections among submodules of the parent genomes.

In some implementations, the procreation module 638, in forming new genomes, forms certain new genomes by crossover between two selected parent genomes such that at least a first selected parent genome includes certain mismatching hyperparameters. In such an implementation, the procreation module 638 forms the new genomes by selecting the mismatching hyperparameters when the first selected parent genome has a higher fitness value.

In some implementations, the procreation module 638, in forming new genomes, forms certain new genomes by crossover between two selected parent genomes such that at least one selected parent genome includes certain mismatching hyperparameters. In such an implementation, the procreation module 638 forms the new genomes by randomly selecting at least one of the mismatching hyperparameters.

In some implementations, the procreation module 638, in forming new genomes, forms certain new genomes by crossover between the global operational hyperparameter values of two selected parent genomes.

In some implementations, the procreation module 638, in forming new genomes, forms certain new genomes by crossover between the local operational hyperparameter values of respective modules of two selected parent genomes.

In some implementations, the procreation module 638, in forming new genomes, forms certain new genomes by mutation which adds a new interconnection between two pre-existing modules.

In some implementations, the procreation module 638, in forming new genomes, forms certain new genomes by mutation which adds new interconnections between two pre-existing submodules.

In some implementations, the procreation module 638, in forming new genomes, forms certain new genomes by mutation which adds a new module to a pre-existing genome.

In some implementations, the procreation module 638, in forming new genomes, forms certain new genomes by mutation which adds new interconnections to and from the new module.

In some implementations, the procreation module 638, in forming new genomes, forms certain new genomes by mutation which adds a new submodule to a pre-existing module.

In some implementations, the procreation module 638, in forming new genomes, forms certain new genomes by mutation which adds new interconnections to and from the new submodule.

In some implementations, the procreation module 638, in forming new genomes, forms certain new genomes by mutation which deletes a pre-existing module from a pre-existing genome.

In some implementations, the procreation module 638, in forming new genomes, forms certain new genomes by mutation which deletes pre-existing interconnections to and from the deleted module.

In some implementations, the procreation module 638, in forming new genomes, forms certain new genomes by mutation which deletes a pre-existing submodule from a pre-existing module.

In some implementations, the procreation module 638, in forming new genomes, forms certain new genomes by mutation which deletes pre-existing interconnections to and from the deleted submodule.

In some implementations, the procreation module 638, in forming new genomes, forms certain new genomes by mutation which changes weights of pre-existing interconnections between the modules.

In some implementations, the procreation module 638, in forming new genomes, forms certain new genomes by mutation which changes weights of pre-existing interconnections between the submodules.

After procreation, the speciation module 612 and the candidate testing module 622 operate again on the updated gene pool 502. The process continues repeatedly. In some implementations, a control module 658 iterates the candidate testing module 622, the competition module 632, and the procreation module 638 until after the competition module 632 yields a candidate pool of genomes not yet discarded but which satisfy a convergence condition. The convergence condition can be defined as an optimal output of the fitness function 504, according to some definition. The convergence condition may be, for example, a recognition that the candidate pool is no longer improving after each iteration.

The following pseudo code shows one implementation of the operation of the training system 500:

```
set_evolution_parameters
create_candidates_generation_1
repeat
    repeat
        train_candidates
        test_candidates
    until candidate_spread_is_sufficient or remove_criteria_is_met
    remove_low_performing_candidates
    create_new_candidates
Until performance_is_sufficient or no_more_designs_are_possible
```

In some implementations, the genomes in the candidate pool are referred to herein as the "winning genomes". In implementations, each iteration through the candidate testing module 622, the competition module 632, and the procreation module 638 can produce just one winning genome or multiple winning genomes.

In some implementations, a candidate harvesting module 665 retrieves the winning genomes from the candidate genome pool 502 and writes them to the production genome pool database 532. In one implementation, the candidate harvesting module 665 retrieves genomes periodically, whereas in another implementation it retrieves genomes only in response to administrator input.

Figure 7:
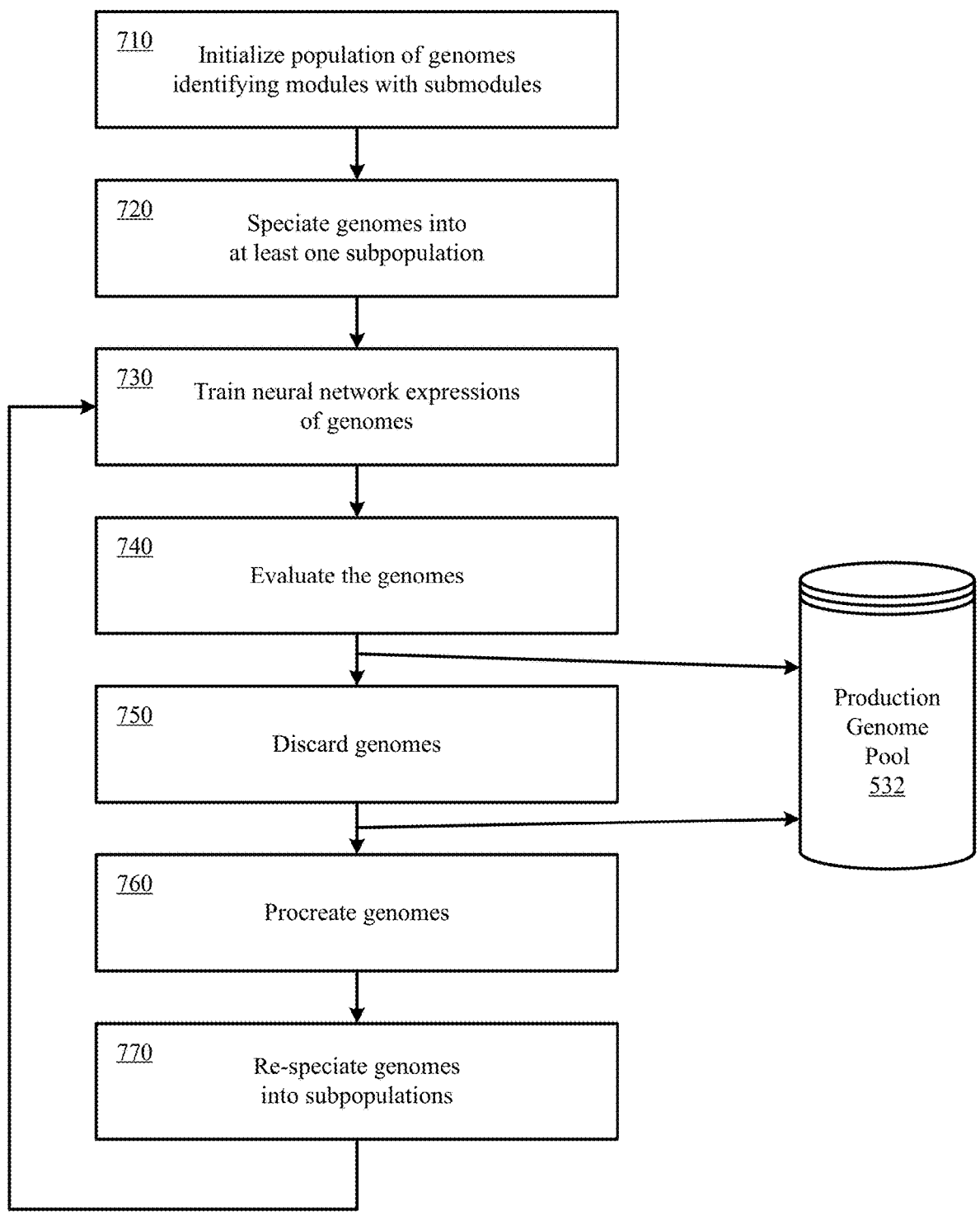
FIG. 7 depicts a representative method of operation of the training system depicted in FIG. 5.

FIG. 7 depicts a representative method of operation of the training system in FIG. 5. The flowchart in FIG. 7 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

FIG. 7 includes a process that begins at action 710 where a population of candidate genomes is initialized. Each of the candidate genomes identifies respective values for a plurality of hyperparameters of the candidate genome. The hyperparameters include global topology hyperparameters identifying a plurality of modules in the genome and interconnections among the modules in the genome. In one implementation, at least one of the modules in each candidate genome includes a neural network, and the hyperparameters further include local topology hyperparameters identifying a plurality of submodules of the neural network and interconnections among the submodules. Further, each candidate genome has associated therewith, storage for an indication of a respective fitness value.

At action 720, the genomes are clustered into at least one subpopulation or species, as discussed above.

At action 730, the neural network expressions of genomes along with corresponding modules are trained on training data by minimizing a loss function, as discussed above. In one implementation, training the modules identified by the genome includes modifying the submodules of the neural network and their interconnections in dependence upon a predetermined back-propagation algorithm.

At action 740, the genomes are evaluated on validation data with respect to a provided problem such as an image classification task or speech recognition task, as discussed above. In one implementation, evaluating genomes from the candidate pool on validation data includes updating the fitness value associated with each of the genomes being evaluated, as discussed above. In some implementations, the genomes are deployed for production to the production genome pool 532 after being evaluated.

At action 750, genomes from the candidate pool are selected for discarding in dependence upon their updated fitness values, as discussed above. In some implementations, the genomes are deployed for production to the production genome pool 532 after being subjected to competition.

At action 760, new genomes are procreated in dependence upon a respective set of at least one parent genome from the candidate pool.

At action 770, the old and new genomes are re-speciated into subpopulations. In some implementations, selected ones of the genomes from the candidate pool are deployed. The process continues repeatedly. In some implementations, the process continues until a candidate pool of genomes not yet discarded but which satisfy a convergence condition are selected.

Figure 8A:
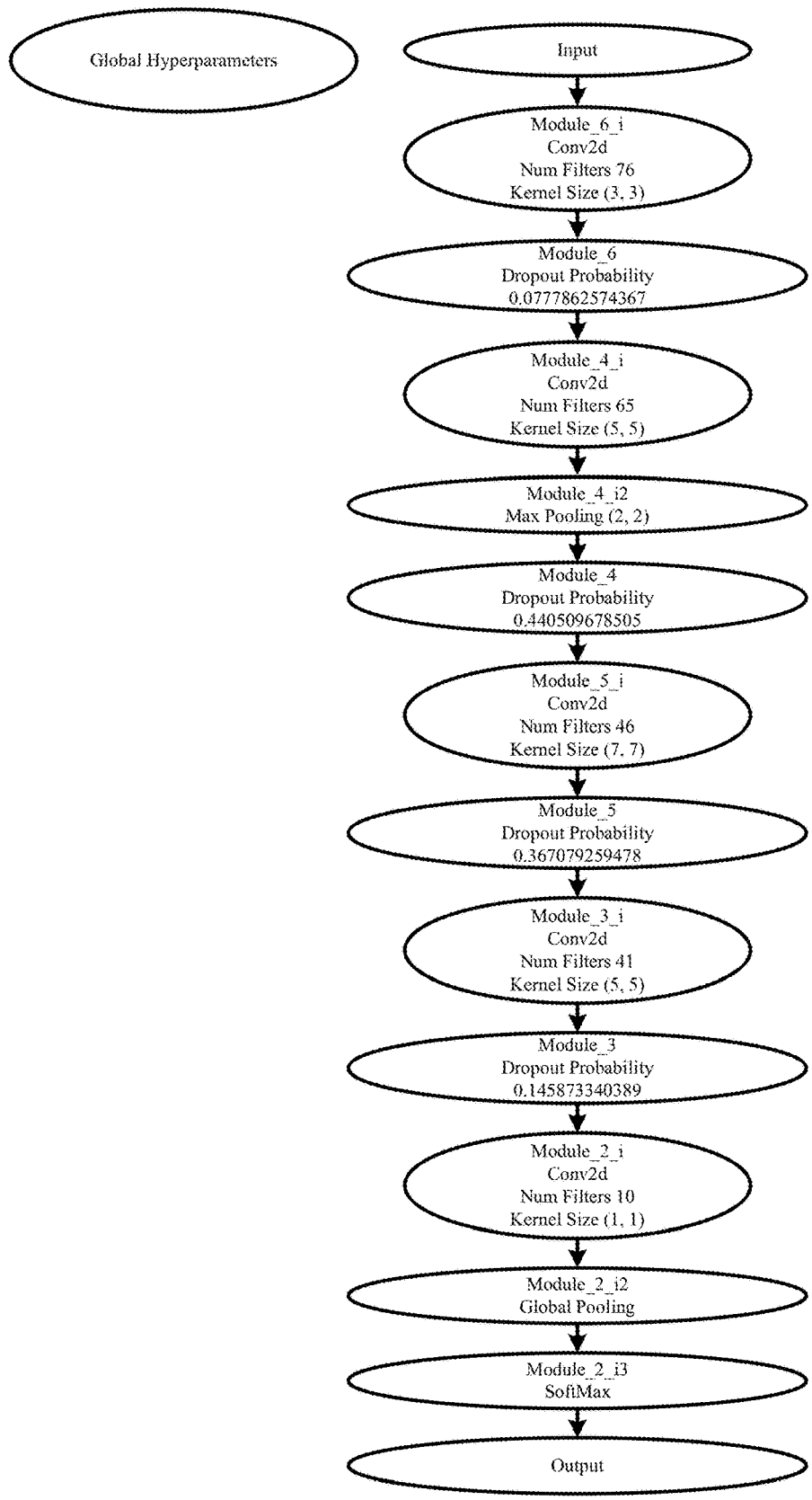
FIGS. 8A, 8B, and 8C illustrate examples of evolved deep neural network structures in accordance with implementations of the technology disclosed.
Figure 8B:
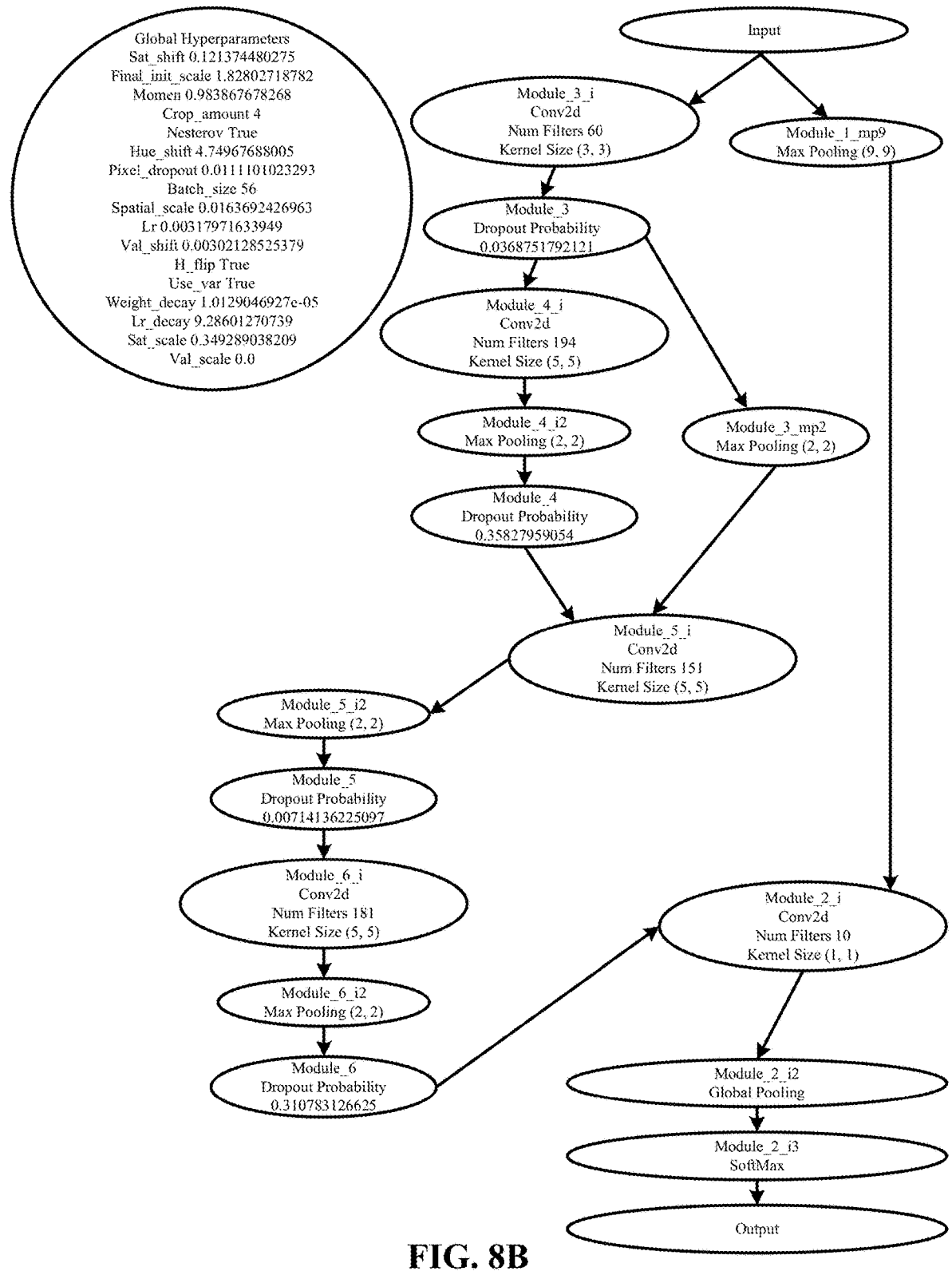
Figure 8C:
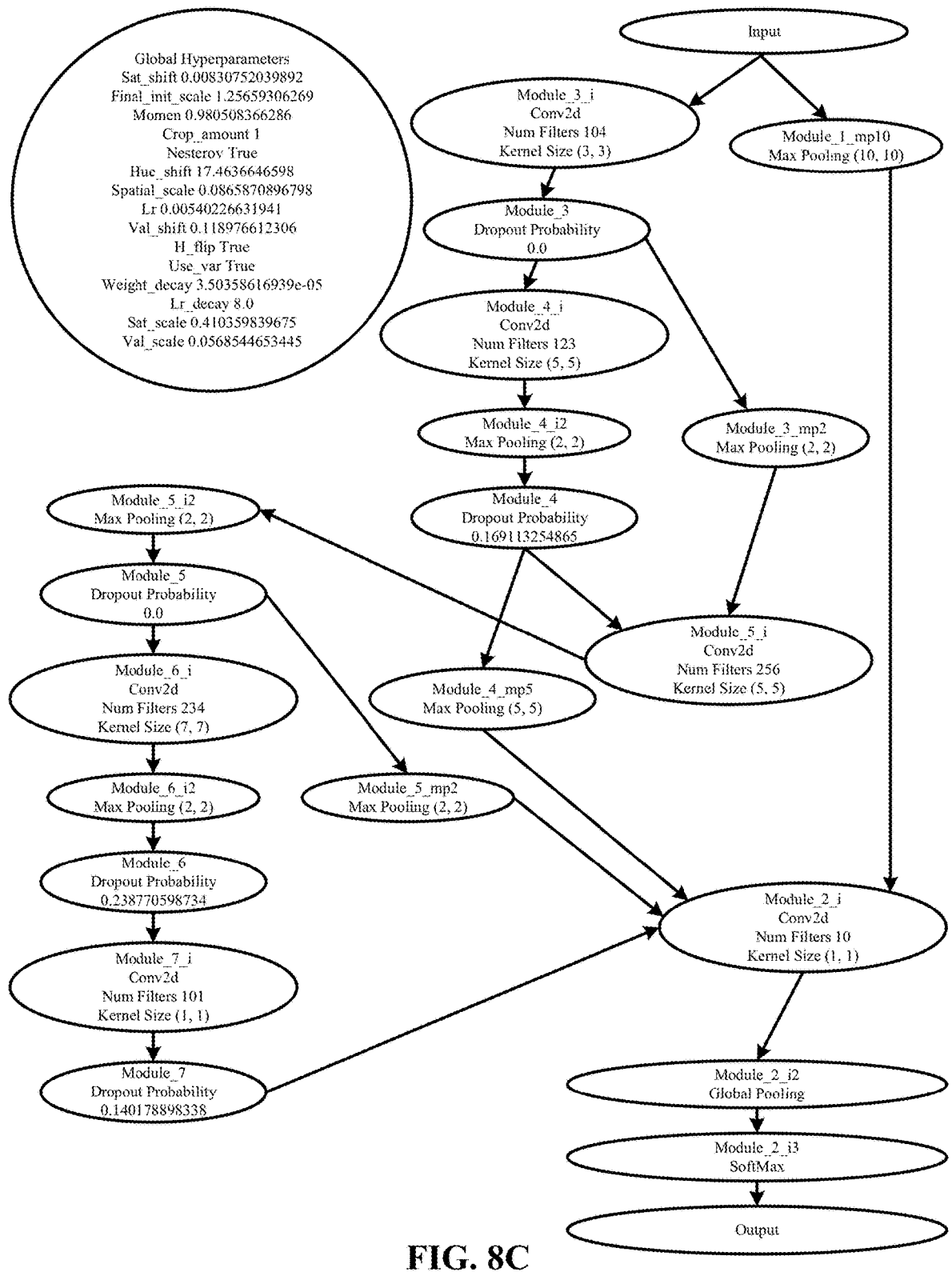

FIGS. 8A, 8B, and 8C illustrate examples of evolved deep neural network structures in accordance with implementations of the technology disclosed. FIG. 8A shows an evolution snapshot of a deep neural network structure after 20 generations. FIG. 8B shows an evolution snapshot of the deep neural network structure after 40 generations. FIG. 8C shows an evolution snapshot of the deep neural network structure after a further generation. As shown in FIGS. 8A-8C, for the deep neural network structure, the following are evolved between some generations or every generation—modules, the interconnections between the modules, the interconnection weights between the modules, the submodules, the interconnections between the submodules, the interconnection weights between the submodules, the global topology hyperparameters, the global operational hyperparameters, the local topology hyperparameters, and the local operational hyperparameters. In some implementations, the evolution includes, for example, modifying a number of modules in the deep neural network structure; modifying the type of modules in the deep neural network structure; modifying the interconnections and interconnection weights between the modules in the deep neural network structure; modifying a number of submodules in a given module; modifying the type of submodules in the module; modifying interconnections and interconnection values between the submodules in the module; modifying the hyperparameters in the deep neural network structure; and modifying the hyperparameter values in the deep neural network structure. In some implementations, the interconnections between the modules are branched out or skipped during the evolution.

Figure 9:
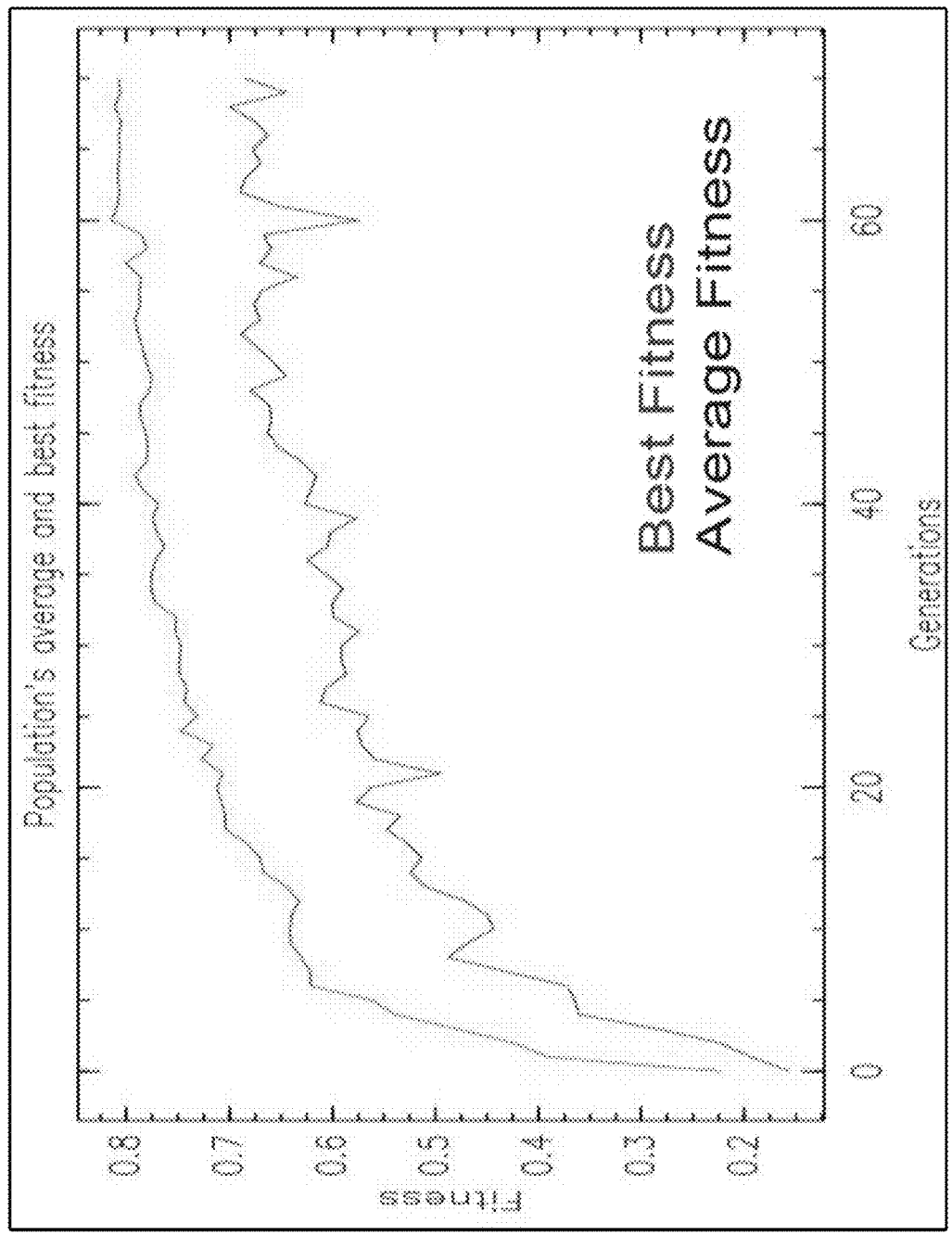
FIG. 9 shows a chart that graphically illustrates performance results of one implementation of the technology disclosed.

FIG. 9 shows a chart 900 that graphically illustrates example performance results of one implementation of the technology disclosed. In particular, FIG. 9 shows the improvement in performance (vertical axis), when trained to 8 epochs, versus the number of generations of neural network evolution (horizontal axis).

Figure 10A:
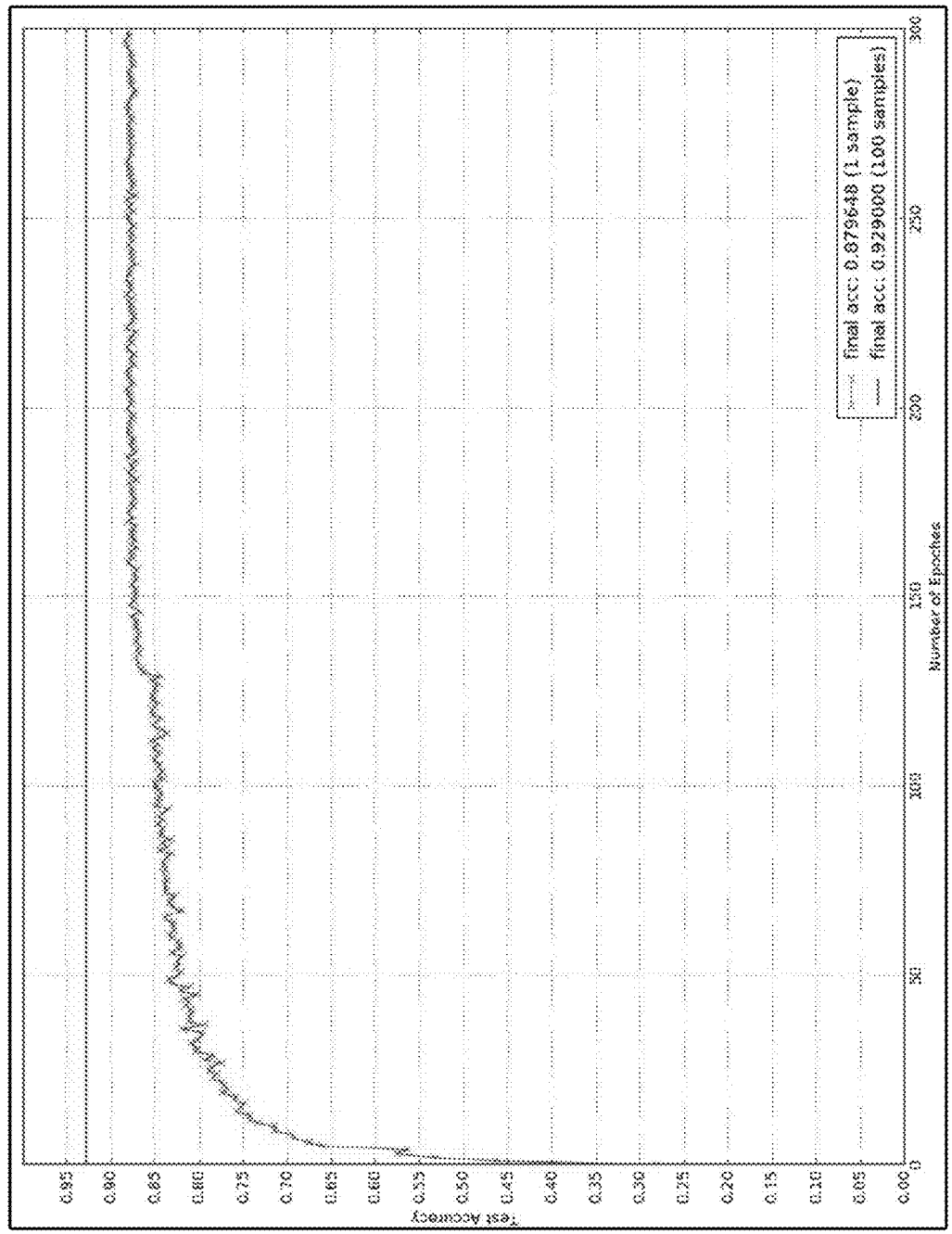
FIG. 10A is another chart that graphically illustrates performance results of another implementation of the technology disclosed.

FIG. 10A is another chart 1000A that graphically illustrates performance results of another implementation of the technology disclosed. In particular, FIG. 10A shows one sample performance (vertical axis) of the best neural network discovered during evolution versus the number of epochs of training and also final converged performance (92.9%) using 100 samples (horizontal axis).

Figure 10B:
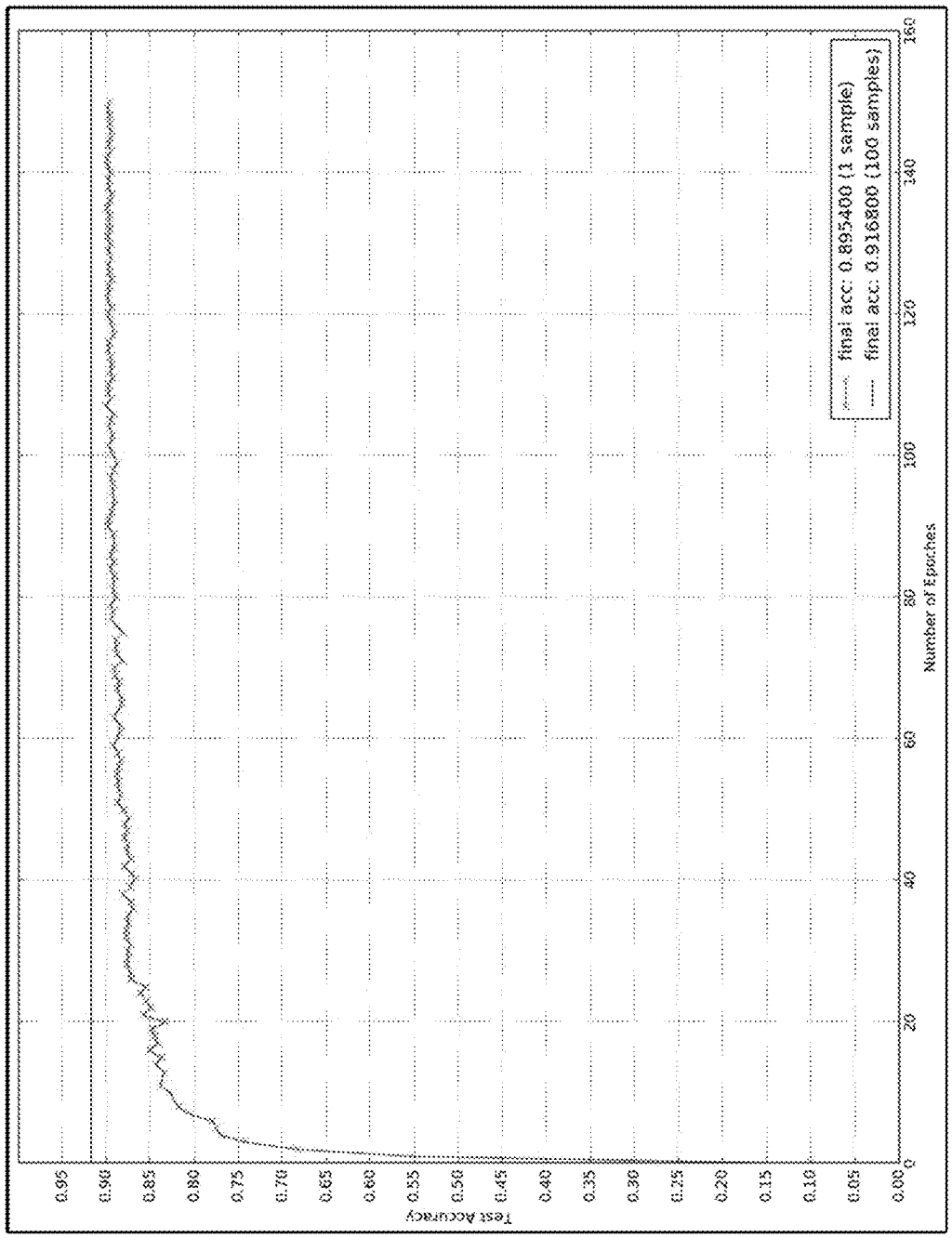
FIG. 10B is yet another chart that graphically illustrates performance results of yet another implementation of the technology disclosed.

FIG. 10B is yet another chart 1000B that graphically illustrates performance results of yet another implementation of the technology disclosed. In particular, FIG. 10B shows one sample performance (vertical axis) of the best neural network discovered during evolution versus the number of epochs of training and also final converged performance (91.6%) using 100 samples (horizontal axis).

Client-Server Architecture

In some environments, the training data used to evaluate a genome's fitness can be voluminous. Therefore, even with modern high processing power and large memory capacity computers, achieving quality results within a reasonable time is often not feasible on a single machine. A large module pool also requires a large memory and high processing power. In one implementation, therefore, a client/server model is used to provide scaling in order to achieve high quality evaluation results within a reasonable time period. Scaling is carried out in two dimensions, namely in pool size as well as in evaluation of the same genome to generate a more diverse module pool so as to increase the probability of finding fitter genomes. In the client/server implementation, the genome pool is distributed over a multitude of clients for evaluation. Each client continues to evaluate its own client-centric module pool using data from training database 518, which it may receive in bulk or periodically on a sustained and continuing basis. Genomes that satisfy one or more predefined conditions on a client computer are transmitted to the server to form part of a server-centric module pool.

Distributed processing of genomes may also be used to increase the speed of evaluation of a given genome. To achieve this, genomes that are received by the server but have not yet been tested on a certain number of samples, or have not yet met one or more predefined conditions, may be sent back from the server to a multitude of clients for further evaluation. The evaluation result achieved by the clients (alternatively called herein as partial evaluation) for a genome is transferred back to the server. The server merges the partial evaluation results of a genome with that genome's fitness estimate at the time it was sent to the clients to arrive at an updated fitness estimate for that genome in the server-centric module pool. For example, assume that a genome has been tested on 500 samples and is sent from the server to, for example, two clients each instructed to test the genome on 100 additional samples. Accordingly, each client further tests the genome on the additional 100 samples and reports its own client-centric fitness estimate to the server. The server combines these two estimates with the genome's fitness estimate at the time it was sent to the two clients to calculate an updated server-centric fitness estimate for the genome. The combined results represent the genome's fitness evaluated over 700 samples. In other words, the distributed system, in accordance with this example, increases the experience level of a genome from 500 samples to 700 samples using only 100 different training samples at each client. A distributed system, in accordance with the technology disclosed, is thus highly scalable in evaluating its genomes.

Advantageously, clients are enabled to perform genome procreation locally, thereby improving the quality of their genomes. Each client is a self-contained evolution device, not only evaluating one or more genomes in its own pool at a time, but also creating a new generation of genomes and moving the evolutionary process forward locally. Thus clients maintain their own client-centric module pool which need not match each other's or the server-centric module pool. Since the clients continue to advance with their own local evolutionary process, their processing power is not wasted even if they are not in constant communication with the server. Once communication is reestablished with the server, clients can send in their fittest genomes to the server and receive additional genomes from the server for further testing.

Particular Implementations

We describe systems, methods, and articles of manufacture for evolving a deep neural network structure. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to the memory. The memory is loaded with computer instructions which, when executed on the processors, cause evolution of a deep neural network structure.

The deep neural network structure includes a plurality of modules and interconnections among the modules. Examples of deep neural network structures include:
AlexNet
ResNet
Inception
WaveNet
PixelCNN
GoogLeNet
ENet
U-Net
BN-NIN
VGG
LeNet
DeepSEA
DeepChem
DeepBind
DeepMotif
FIDDLE
DeepLNC
DeepCpG
DeepCyTOF
SPINDLE The memory stores a candidate genome database that contains a pool of candidate genomes. Each of the candidate genomes identify respective values for a plurality of hyperparameters of the candidate genome. The hyperparameters include global topology hyperparameters that identify a plurality of modules in the genome and interconnections among the modules in the genome.

At least one of the modules in each candidate genome includes a neural network. The hyperparameters further include local topology hyperparameters that identify a plurality of submodules of the neural network and interconnections among the submodules. Each candidate genome is associated therewith storage for an indication of a respective fitness value.

The system includes a candidate pool processor. The candidate pool processors trains the modules identified by the genome. The training includes modifying the submodules of the neural network and their interconnections in dependence upon a predetermined back-propagation algorithm such as stochastic gradient descent (SGD) or a SGD-variant like Adam. The candidate pool processor evaluates genomes from the candidate pool on validation data. The evaluation includes updating the fitness value associated with each of the genomes being evaluated.

The system includes a competition module. The competition module selects genomes from the candidate pool for discarding in dependence upon their updated fitness values.

The system includes a procreation module. The procreation module forms new genomes in dependence upon a respective set of at least one parent genome from the candidate pool.

The system includes a genome harvesting module. The genome harvesting module provides for deploying a selected ones of the genomes from the candidate pool.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The system can include a population initialization module. The population initialization module can initialize the memory with an initial candidate genome pool. The global topology hyperparameters of each of the candidate genomes in the initial candidate genome pool can identify a plurality of minimal structure modules in each candidate genome. At least one of the minimal structure modules can be a neural network with zero hidden submodules.

Each of the candidate genomes in the initial candidate genome pool can identify uniform respective values for the global topology hyperparameters in each candidate genome.

Each of the candidate genomes in the initial candidate genome pool can identify different respective values for the global topology hyperparameters in each candidate genome.

Each of the candidate genomes in the initial candidate genome pool can identify different respective values for at least one of the local topology hyperparameters in each candidate genome.

Each of the candidate genomes in the initial candidate genome pool can identify different respective values for at least one of local operational hyperparameters in each candidate genome.

Each of the candidate genomes in the initial candidate genome pool can identify different respective values for at least one of global operational hyperparameters in each candidate genome.

The procreation module, in forming new genomes, can incrementally complexify the minimal structure modules in each candidate genome. The incremental complexification can comprise adding new submodules in the minimal structure modules using mutation.

The procreation module can form new genomes in dependence upon a respective set of at least one parent genome with at least one minimal structure module. Certain new genomes can identify global topology hyperparameter values that identify new complex submodules formed in dependence upon the minimal structure module using crossover.

The procreation module can form new genomes in dependence upon a respective set of at least one parent genome with at least one minimal structure module. At least one of the new genomes can identify values for global topology hyperparameters that identify new complex submodules formed in dependence upon the minimal structure module using crossover.

The modules identified by each of more than one of the candidate genomes can include more than one neural network.

The modules identified by one of the candidate genomes can include a convolutional neural network.

The module identified by one of the candidate genomes can include a residual block.

The modules identified by one of the candidate genomes can include a convolution module (e.g., 3×3 convolution).

The modules identified by one of the candidate genomes can include a dimensionality reduction module (e.g., 1×1 convolution).

The modules identified by one of the candidate genomes can include a dimensionality augmentation module (e.g., 1×1 convolution).

The modules identified by one of the candidate genomes can include a pooling module (e.g., max pooling, average pooling).

The modules identified by one of the candidate genomes can include a subsampling module (e.g., max pooling, average pooling, dilated or atrous convolutions, strides, padding).

The modules identified by one of the candidate genomes can include a concatenation module.

The modules identified by one of the candidate genomes can include a summation module.

The modules identified by one of the candidate genomes can include a batch normalization module.

The modules identified by one of the candidate genomes can include an activation module (e.g., sigmoid function, rectified linear units (ReLUs), hyperbolic tangent function, absolute of hyperbolic tangent function, leaky ReLUs (LReLUs), and parametrized ReLUs (PReLUs)).

The modules identified by one of the candidate genomes can include a classification module (e.g., multi-class support vector machine (SVM), a Softmax classifier, and a multinomial logistic regressor).

The modules identified by one of the candidate genomes can include a pre-processing module (e.g., an input module, a normalization module, a patch-extraction module, and a noise-addition module).

The modules identified by one of the candidate genomes can include a post-processing module (e.g., an output module, an estimation module, and a modelling module).

Example modules identified by one of the candidate genomes can include:
- a fully-connected neural network
- a fully convolutional network without a fully-connected neural network
- a convolutional autoregressive model
- a deconvolution network
- a recursive neural network
- a recurrent neural network
- a deep stacking neural network
- a feed-forward neural network
- a shallow neural network
- a Boltzmann machine
- a Restricted Boltzmann machine
- a Deep Boltzmann machine
- a counter-propagation neural network
- a radial basis function neural network
- a wavelet neural network
- a self-organizing neural network
- a neural turing machine
- a highway network
- a maxout network
- an attention-based neural network
- a residual connections-based deep neural network
- a skip connections-based deep neural network The global topology hyperparameters can identify a type for each of the modules in the genome. The global topology hyperparameters can identify a sequence of processing data through each of the modules in the genome. The global topology hyperparameters can identify a branching and rejoining of modules in the genome. The global topology hyperparameters can identify an interconnection in one branch that skips over at least one module in another branch.

The local topology hyperparameters that identify submodules of the neural network can be a number of neuron layers in the neural network. The local topology hyperparameters that identify submodules of the neural network can be a number of neurons in each of the neuron layers in the neural network. The local topology hyperparameters that identify submodules can be a kernel size. The local topology hyperparameters that identify submodules can be a number of kernels. The local topology hyperparameters that identify submodules can be a kernel depth. The local topology hyperparameters that identify submodules can be a kernel stride. The local topology hyperparameters that identify submodules can be a kernel padding. The local topology hyperparameters that identify submodules can be a dropout rate. The local topology hyperparameters that identify submodules can be an activation function. The local topology hyperparameters that identify submodules can be a subsampling parameter. The local topology hyperparameters that identify submodules can be a pooling parameter. The local topology hyperparameters that identify submodules can be a normalization parameter (e.g., pre-non-linearity activation or post-non-linearity activation).

The local topology hyperparameters that identify submodules can be a residual block. The local topology hyperparameters that identify submodules can be a number of residual blocks. The local topology hyperparameters that identify submodules can be a residual connection. The local topology hyperparameters that identify submodules can be a skip connection. The local topology hyperparameters that identify submodules can be a number of inputs to a first layer of a neural network. The local topology hyperparameters that identify submodules can be a number of inputs to an intermediate layer of a neural network. The local topology hyperparameters that identify submodules can be a type of inputs to a first layer of a neural network. The local topology hyperparameters that identify submodules can be a type of inputs to an intermediate layer of a neural network.

The hyperparameters can further include global operational hyperparameters that apply to entire genomes. Examples of global operational hyperparameters can include:
  learning rate
  learning rate decay
  momentum
  weight initialization
  regularization strength
  initialization deviation
  input initialization deviation
  Hue shift
  saturation scale
  saturation shift
  value scale
  value shift
  pixel dropout
  scaling
  L2 weight decay
  fully-connected layer drop out The hyperparameters can further include local operational hyperparameters that are specific to respective modules in the genome. The local operational hyperparameters can include at least learning rate, momentum, weight initialization, and fully-connected layer drop out.

The candidate pool processor can include a server computer system with respect to a plurality of client computer systems. The training of the modules can include the server computer system transmitting different genomes of the candidate pool toward different client computer systems for the training.

Evaluation of the genomes can include the server computer system transmitting different genomes of the candidate pool toward different client computer systems for the evaluation.

Discarding of the genomes can include the server computer system transmitting different genomes of the candidate pool toward different client computer systems for the competition.

Procreation of the genomes can include the server computer system transmitting different genomes of the candidate pool toward different client computer systems for the procreation.

The system can include a speciation module. The speciation module can group the evaluated genomes from the candidate pool into species by similarity. Discarding of genomes by the competition module in dependence upon their updated fitness values can comprise comparing the updated fitness values of genomes only to other genomes in the same species.

The similarity can be determined by comparing the global topology hyperparameter values of the genomes. The similarity can be determined by comparing the local topology hyperparameter values of respective modules in the genomes. The similarity can be determined by comparing the global operational hyperparameter values of the genomes. The similarity can be determined by comparing the local operational hyperparameter values of respective modules in the genomes. The similarity can be determined by comparing the local operational hyperparameter values of respective modules in the genomes.

The procreation module, in forming new genomes, can form certain new genomes by crossover between the global topology hyperparameter values of two selected parent genomes. The crossover between the global topology hyperparameter values of the two selected parent genomes can include a crossover between modules of the parent genomes. The crossover between the global topology hyperparameter values of the two selected parent genomes can include a crossover between interconnections among modules of the parent genomes.

The procreation module, in forming new genomes, can form certain new genomes by crossover between the local topology hyperparameter values of respective modules of two selected parent genomes. The crossover between the local topology hyperparameter values of the two selected parent genomes can include a crossover between submodules of the parent genomes. The crossover between the local topology hyperparameter values of the two selected parent genomes can include a crossover between interconnections among submodules of the parent genomes.

The procreation module, in forming new genomes, can form certain new genomes by crossover between two selected parent genomes. At least a first selected parent genome can include certain mismatching hyperparameters. The new genomes can be formed by selecting the mismatching hyperparameters when the first selected parent genome has a higher fitness value.

The procreation module, in forming new genomes, can form certain new genomes by crossover between two selected parent genomes. At least one selected parent genome can include certain mismatching hyperparameters. The new genomes can be formed by randomly selecting at least one of the mismatching hyperparameters.

The procreation module, in forming new genomes, can form certain new genomes by crossover between the global operational hyperparameter values of two selected parent genomes.

The procreation module, in forming new genomes, can form certain new genomes by crossover between the local operational hyperparameter values of respective modules of two selected parent genomes.

The procreation module, in forming new genomes, can form certain new genomes by mutation which adds a new interconnection between two pre-existing modules.

The procreation module, in forming new genomes, can form certain new genomes by mutation which adds new interconnections between two pre-existing submodules.

The procreation module, in forming new genomes, can form certain new genomes by mutation which adds a new module to a pre-existing genome.

The procreation module, in forming new genomes, can form certain new genomes by mutation which adds new interconnections to and from the new module.

The procreation module, in forming new genomes, can form certain new genomes by mutation which adds a new submodule to a pre-existing module.

The procreation module, in forming new genomes, can form certain new genomes by mutation which adds new interconnections to and from the new submodule.

The procreation module, in forming new genomes, can form certain new genomes by mutation which deletes a pre-existing module from a pre-existing genome.

The procreation module, in forming new genomes, can form certain new genomes by mutation which deletes pre-existing interconnections to and from the deleted module.

The procreation module, in forming new genomes, can form certain new genomes by mutation which deletes a pre-existing submodule from a pre-existing module.

The procreation module, in forming new genomes, can form certain new genomes by mutation which deletes pre-existing interconnections to and from the deleted submodule.

The procreation module, in forming new genomes, can form certain new genomes by mutation which changes weights of pre-existing interconnections between the modules.

The procreation module, in forming new genomes, can form certain new genomes by mutation which changes weights of pre-existing interconnections between the submodules.

Other implementations may include a non-transitory computer readable storage medium storing instructions executable by a processor to perform actions of the system described above. Yet another implementation may include a method performing the actions of the system described above.

A method implementation of the technology disclosed includes evolving a deep neural network structure.

The deep neural network structure includes a plurality of modules and interconnections among the modules. Examples of deep neural network structures include:
  AlexNet
  ResNet
  Inception
  WaveNet
  PixelCNN
  GoogLeNet
  ENet
  U-Net
  BN-NIN
  VGG
  LeNet
  DeepSEA
  DeepChem
  DeepBind
  DeepMotif
  FIDDLE
  DeepLNC
  DeepCpG
  DeepCyTOF
  SPINDLE The method includes storing a candidate genome database having a pool of candidate genomes. Each of the candidate genomes identify respective values for a plurality of hyperparameters of the candidate genome. The hyperparameters include global topology hyperparameters that identify a plurality of modules in the genome and interconnections among the modules in the genome.

At least one of the modules in each candidate genome includes a neural network. The hyperparameters further include local topology hyperparameters that identify a plurality of submodules of the neural network and interconnections among the submodules. Each candidate genome is associated therewith storage for an indication of a respective fitness value.

The method includes training the modules identified by the genome. The training includes modifying the submodules of the neural network and their interconnections in dependence upon a predetermined back-propagation algorithm such as stochastic gradient descent (SGD) or a SGD-variant like Adam.

The method includes evaluating genomes from the candidate pool on validation data. The evaluation includes updating the fitness value associated with each of the genomes being evaluated.

The method includes selecting genomes from the candidate pool for discarding in dependence upon their updated fitness values.

The method includes forming new genomes in dependence upon a respective set of at least one parent genome from the candidate pool.

The method includes deploying a selected ones of the genomes from the candidate pool.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the method described above. Yet another implementation may include a system including memory and one or more processors operable to execute instructions, stored in the memory, to perform the method described above.

Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation, or an HBase™ or DynamoDB™ compatible non-relational database implementation. In addition, the technology disclosed can be implemented using different programming models like MapReduce™, bulk synchronous programming, MPI primitives, etc., or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Computer System

Figure 11:
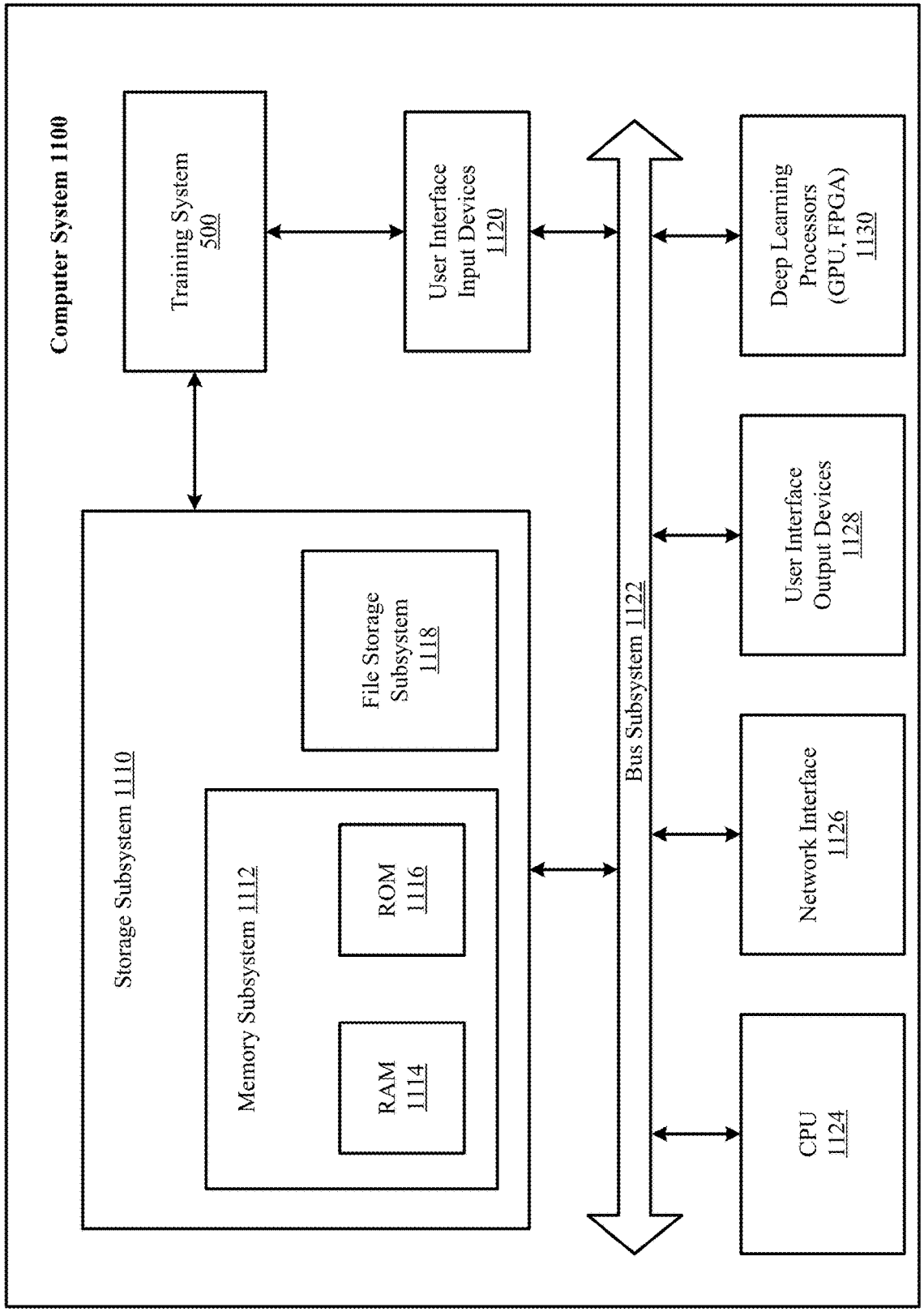
FIG. 11 is a simplified block diagram of a computer system that can be used to implement either or both of the training system and the production system of the technology disclosed.

FIG. 11 is a simplified block diagram of a computer system 1100 that can be used to implement either or both of the training system and the production system of the technology disclosed. Computer system 1100 includes at least one central processing unit (CPU) 1124 that communicates with a number of peripheral devices via bus subsystem 1122. These peripheral devices can include a storage subsystem 1110 including, for example, memory devices and a file storage subsystem 1118, user interface input devices 1120, user interface output devices 1128, and a network interface subsystem 1126. The input and output devices allow user interaction with computer system 1100. Network interface subsystem 1126 provides an interface to outside networks, including an interface to corresponding interface devices in other computer systems.

In one implementation, the training system 500 in FIG. 9 and/or the production system 534 in FIG. 9 are communicably linked to the storage subsystem 1110 and a user interface input devices 1120.

User interface input devices 1120 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1128 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1110 stores programming and data constructs that provide the functionality of some or all of the modules and methods described herein. These software modules are generally executed by deep learning processors 1130.

Deep learning processors 1130 can be graphics processing units (GPUs) or field-programmable gate arrays (FPGAs). Deep learning processors 1130 can be hosted by a deep learning cloud platform such as Google Cloud Platform™, Xilinx™, and Cirrascale™. Examples of deep learning processors 1130 include Google's Tensor Processing Unit (TPU)™, rackmount solutions like GX4 Rackmount Series™, GX8 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 1112 used in the storage subsystem 1110 can include a number of memories including a main random access memory (RAM) 1114 for storage of instructions and data during program execution and a read only memory (ROM) 1116 in which fixed instructions are stored. A file storage subsystem 1118 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1118 in the storage subsystem 1110, or in other machines accessible by the processor.

Bus subsystem 1122 provides a mechanism for letting the various components and subsystems of computer system 1100 communicate with each other as intended. Although bus subsystem 1122 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1100 depicted in FIG. 11 is intended only as a specific example for purposes of illustrating the preferred embodiments of the present invention. Many other configurations of computer system 1100 are possible having more or less components than the computer system depicted in FIG. 11.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented system for evolving a deep neural network structure, the deep neural network structure including a plurality of modules and interconnections among the modules, comprising:

a memory storing a candidate genome database having a pool of candidate genomes, each of the candidate genomes identifying respective values for a plurality of hyperparameters of the candidate genome, the hyperparameters including global topology hyperparameters identifying a plurality of modules in the genome and interconnections among the modules in the genome, at least one of the modules in each candidate genome including a neural network, the neural network including a plurality of layers, and the hyperparameters further including local topology hyperparameters identifying a plurality of submodules of the neural network and interconnections among the submodules, each candidate genome having associated therewith storage for an indication of a respective fitness value;

a candidate pool processor which:

trains the modules identified by the genome, including modifying the submodules of the neural network and their interconnections in dependence upon a predetermined back-propagation algorithm;

evaluates genomes from the candidate pool on validation data, including updating the fitness value associated with each of the genomes being evaluated;

selects genomes from the candidate pool for discarding in dependence upon their updated fitness values;

forms new genomes in dependence upon a respective set of at least one parent genome from the candidate pool; and deploys a selected one of the genomes from the candidate pool.

2. The system of claim 1, wherein the candidate pool processor further initializes the memory with an initial candidate genome pool.

3. The system of claim 2, wherein global topology hyperparameters of each of the candidate genomes in the initial candidate genome pool identify a plurality of minimal structure modules in each candidate genome.

4. The system of claim 3, wherein at least one of the minimal structure modules is a neural network with zero hidden submodules.

5. The system of claim 3, wherein each of the candidate genomes in the initial candidate genome pool identifies uniform respective values for the global topology hyperparameters in each candidate genome.

6. The system of claim 3, wherein each of the candidate genomes in the initial candidate genome pool identifies different respective values for the global topology hyperparameters in each candidate genome.

7. The system of claim 3, wherein each of the candidate genomes in the initial candidate genome pool identifies different respective values for at least one of the local topology hyperparameters in each candidate genome.

8. The system of claim 3, wherein each of the candidate genomes in the initial candidate genome pool identifies different respective values for at least one of local operational hyperparameters in each candidate genome.

9. The system of claim 3, wherein each of the candidate genomes in the initial candidate genome pool identifies different respective values for at least one of global operational hyperparameters in each candidate genome.

10. The system of claim 3, wherein the forming new genomes incrementally complexifies the minimal structure modules in each candidate genome.

11. The system of claim 10, wherein the incremental complexification comprises adding new submodules in the minimal structure modules using mutation.

12. The system of claim 3, wherein new genomes are formed in dependence upon a respective set of at least one parent genome with at least one minimal structure module, and wherein certain new genomes identify global topology hyperparameter values identifying new complex submodules formed in dependence upon the minimal structure module using crossover.

13. The system of claim 3, wherein new genomes are formed in dependence upon a respective set of at least one parent genome with at least one minimal structure module, and, wherein at least one of the new genomes identifies values for global topology hyperparameters identifying new complex submodules formed in dependence upon the minimal structure module using crossover.

14. The system of claim 1, wherein the modules identified by each of more than one of the candidate genomes include more than one neural network.

15. The system of claim 1, wherein the modules identified by one of the candidate genomes include a convolutional neural network.

16. The system of claim 1, wherein the modules identified by one of the candidate genomes include a convolution module.

17. The system of claim 1, wherein the modules identified by one of the candidate genomes include a fully-connected neural network.

18. The system of claim 1, wherein the global topology hyperparameters identify a type for each of the modules in the genome.

19. The system of claim 1, wherein the global topology hyperparameters identify a sequence of processing data through each of the modules in the genome.

20. The system of claim 1, wherein the global topology hyperparameters identify a branching and rejoining of modules in the genome.

21. The system of claim 20, wherein the global topology hyperparameters identify an interconnection in one branch that skips over at least one module in another branch.

22. The system of claim 1, wherein the local topology hyperparameters identifying submodules of the neural network include a number of neuron layers in the neural network.

23. The system of claim 1, wherein the hyperparameters further include global operational hyperparameters that apply to entire genomes.

24. The system of claim 1, wherein the hyperparameters further include local operational hyperparameters that are specific to respective modules in the genome.

25. The system of claim 1, wherein the candidate pool processor further groups the evaluated genomes from the candidate pool into species by similarity, and wherein genomes are discarded in dependence upon their updated fitness values comprises comparing the updated fitness values of genomes only to other genomes in the same species.

26. A method of evolving a deep neural network structure, the deep neural network structure including a plurality of modules and interconnections among the modules, including:

storing a candidate genome database having a pool of candidate genomes, each of the candidate genomes identifying respective values for a plurality of hyperparameters of the candidate genome, the hyperparameters including global topology hyperparameters identifying a plurality of modules in the genome and interconnections among the modules in the genome, at least one of the modules in each candidate genome including a neural network, the neural network including a plurality of layers, and the hyperparameters further including local topology hyperparameters identifying a plurality of submodules of the neural network and interconnections among the submodules, each candidate genome having associated therewith storage for an indication of a respective fitness value;

training the modules identified by the genome, including modifying the submodules of the neural network and their interconnections in dependence upon a predetermined back-propagation algorithm;

evaluating genomes from the candidate pool on validation data, including updating the fitness value associated with each of the genomes being evaluated;

selecting genomes from the candidate pool for discarding in dependence upon their updated fitness values;

forming new genomes in dependence upon a respective set of at least one parent genome from the candidate pool; and deploying a selected one of the genomes from the candidate pool.

27. A non-transitory computer readable storage medium impressed with computer program instructions to evolve a deep neural network structure, the deep neural network structure including a plurality of modules and interconnections among the modules, the instructions, when executed on a processor, implement a method comprising:
  storing a candidate genome database having a pool of candidate genomes, each of the candidate genomes identifying respective values for a plurality of hyperparameters of the candidate genome, the hyperparameters including global topology hyperparameters identifying a plurality of modules in the genome and interconnections among the modules in the genome, at least one of the modules in each candidate genome including a neural network, the neural network including a plurality of layers, and the hyperparameters further including local topology hyperparameters identifying a plurality of submodules of the neural network and interconnections among the submodules, each candidate genome having associated therewith storage of an indication of a respective fitness value;
  training the modules identified by the genome, including modifying the submodules of the neural network and their interconnections in dependence upon a predetermined back-propagation algorithm;
  evaluating genomes from the candidate pool on validation data, including updating the fitness value associated with each of the genomes being evaluated;
  selecting genomes from the candidate pool for discarding in dependence upon their updated fitness values;
  forming new genomes in dependence upon a respective set of at least one parent genome from the candidate pool; and
  deploying a selected one of the genomes from the candidate pool.

* * * * *